(12) United States Patent
Arima et al.

(10) Patent No.: US 11,164,018 B2
(45) Date of Patent: Nov. 2, 2021

(54) IDENTIFICATION DEVICE, VEHICLE MONITORING SYSTEM, AND VEHICLE MONITORING METHOD

(71) Applicant: PANASONIC I-PRO SENSING SOLUTIONS CO., LTD., Fukuoka (JP)

(72) Inventors: Yuji Arima, Fukuoka (JP); Yuma Kobayashi, Fukuoka (JP); Toshimasa Funaki, Fukuoka (JP); Ryutaro Sen, Fukuoka (JP); Hideaki Takahashi, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/743,487

(22) Filed: Jan. 15, 2020

(65) Prior Publication Data

US 2020/0226394 A1 Jul. 16, 2020

(30) Foreign Application Priority Data

Jan. 16, 2019 (JP) .............................. JP2019-005080

(51) Int. Cl.
*G06K 9/00* (2006.01)
*H04N 7/18* (2006.01)
*G06K 9/32* (2006.01)

(52) U.S. Cl.
CPC ..... *G06K 9/00832* (2013.01); *G06K 9/00771* (2013.01); *G06K 9/325* (2013.01); *H04N 7/181* (2013.01)

(58) Field of Classification Search
CPC ........... G06K 9/00255; G06K 9/00771; G06K 9/00832; H04N 7/181
See application file for complete search history.

(56) References Cited

U.S. PATENT DOCUMENTS

| 2006/0030985 | A1* | 2/2006 | Lawida | ..................... | G08G 1/04 |
| | | | | | 701/33.4 |
| 2013/0050492 | A1* | 2/2013 | Lehning | ............. | G06K 9/00785 |
| | | | | | 348/148 |
| 2014/0218785 | A1 | 8/2014 | Aubert et al. | | |
| 2015/0125042 | A1* | 5/2015 | Haden | ................ | G06K 9/00771 |
| | | | | | 382/105 |
| 2018/0349679 | A1* | 12/2018 | Rozploch | ............ | G06K 9/00288 |

FOREIGN PATENT DOCUMENTS

JP 2004-536410 12/2004

* cited by examiner

*Primary Examiner* — Zhubing Ren
(74) *Attorney, Agent, or Firm* — Greenblum & Bernstein, P.L.C.

(57) ABSTRACT

An identification device includes a processor configured to acquire a result of determining, based on a part of an image with a moving object which does not include a face of an occupant on the moving object, whether the occupant is an identification target, and to identify the face of the occupant based on an image including the face of the occupant if the result indicates that the occupant is the identification target.

9 Claims, 15 Drawing Sheets

IDENTIFICATION DEVICE, VEHICLE MONITORING SYSTEM, AND VEHICLE MONITORING METHOD

BACKGROUND OF THE INVENTION

1. Field of the Invention

The present disclosure relates to an identification device, a vehicle monitoring system, and a vehicle monitoring method.

2. Description of the Related Art

U.S. Pat. No. 7,142,078B describes a system for automatically recognizing a vehicle number of a monitored vehicle using a monitoring vehicle. The system is set such that information on the monitored vehicle that is operating or parked is obtained by the monitoring vehicle having a camera, whether there is a problem with the monitored vehicle is grasped through a database, and initial processing can be performed on the suspicious vehicle.

Meanwhile, with an increase in the number of imaging devices that image an unspecific number of persons, there is an increasing concern about privacy infringement. Therefore, there is a need for an identification device for an occupant on a moving object taking into account the privacy infringement.

SUMMARY OF THE INVENTION

An embodiment of the present disclosure aims to provide an improved imaging device, imaging method, identification device, identification method, and identification program used for identifying an occupant on a moving object.

An embodiment of the present disclosure provides an imaging device, including an imaging element, and a processor that allocates an image frame, that is obtained from output of the imaging element, to different video streams based on an exposure time of the imaging element in the image frame.

An embodiment of the present disclosure provides an imaging method, including: acquiring an image frame from output of an imaging element, and allocating the image frame to different video streams based on an exposure time of the imaging element in the image frame.

An embodiment of the present disclosure provides an identification device, including a processor that acquires a result of determining, based on a part of an image with a moving object which does not include a face of an occupant on the moving object, whether the occupant is an identification target, and identifies the face of the occupant based on an image including the face of the occupant if the result indicates that the occupant is the identification target.

An embodiment of the present disclosure provides an identification method, including: acquiring a result of determining, based on a part of an image with a moving object which does not include a face of an occupant on the moving object, whether the occupant is an identification target, and identifying the face of the occupant based on an image including the face of the occupant if the result indicates that the occupant is the identification target.

An embodiment of the present disclosure provides an identification program, when being executed, causing a processor to: acquire a result of determining, based on a part of an image with an moving object which does not include a face of an occupant on the moving object, whether the occupant is an identification target, and identify the face of the occupant based on an image including the face of the occupant if the result indicates that the occupant is the identification target.

It should be noted that these comprehensive or specific aspects may be realized by a system, a device, a method, an integrated circuit, a computer program or a recording medium, or may be realized by any combination of the system, the device, the method, the integrated circuit, the computer program, and the recording medium.

According to embodiments of the present disclosure, an improved imaging device, imaging method, identification device, identification method, and identification program used for identifying an occupant on a moving object can be provided.

Further advantages and effects in embodiments of the present disclosure will be apparent from the specification and drawings. These advantages and/or effects are provided by features described in several embodiments and the specification and drawings, but it is not necessary to provide all the embodiments and the specification and drawings in order to obtain one or more identical features.

DETAILED DESCRIPTION OF THE EXEMPLARY EMBODIMENTS

In recent years, as a decrease in price and an increase in performance of image sensors, there is an increase in installation of imaging devices that image an unspecified number of persons. For example, passenger vehicles are often used to escape after criminal activities. Therefore, identifying a passenger of a passenger vehicle that is running or stopped is useful for controlling and investigating criminal activities.

Meanwhile, a probability for a person being imaged without his/her notice is increasing. Further, with development of the image processing technology in recent years, an opportunity of classifying and using personal images without his/her notice is increasing. Therefore, there is a need for an identification system that can prevent unintended use of a personal image.

Hereinafter, embodiments of the present disclosure will be described in detail with reference to the drawings. Embodiments to be described hereinafter are exemplary, and the present disclosure is not limited to the embodiment hereinafter. Hereinafter, the present disclosure will be described using a vehicle (passenger vehicle) as an example of a moving object, but the moving object is not limited to a vehicle.

(Embodiment 1)

Figure 1:
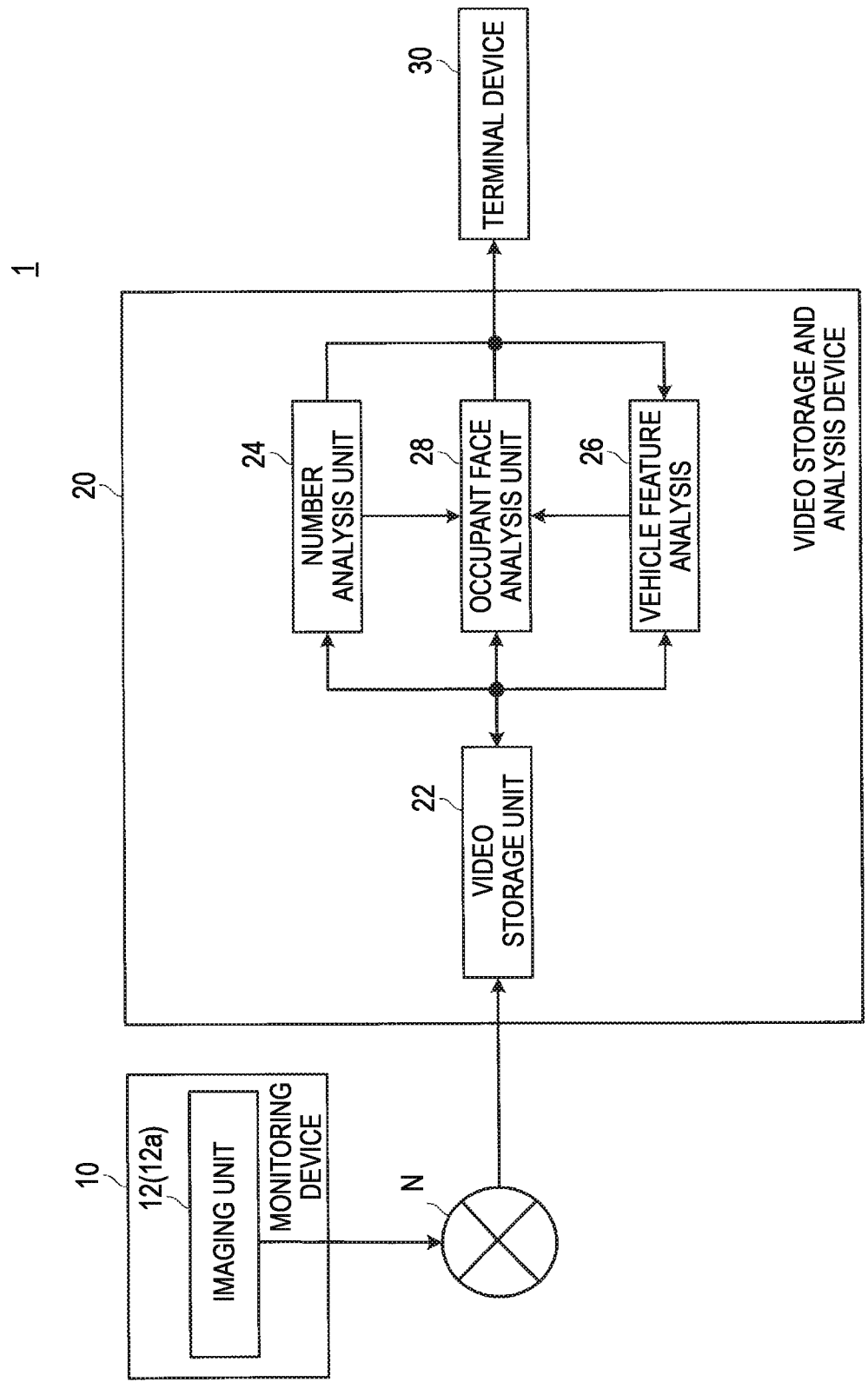
FIG. 1 is a diagram showing an example of a configuration of a monitoring system according to Embodiment 1.

FIG. 1 is a diagram showing an example of a configuration of a monitoring system 1 according to Embodiment 1.

The monitoring system 1 includes a monitoring device (imaging device) 10, a video storage and analysis device (identification device) 20, and a terminal device 30.

The monitoring device 10 images a region to be monitored and outputs video data. The region to be monitored includes, for example, two regions, a region including a face of an occupant on a vehicle and a region including no face. The region including no face has a region including a part of the vehicle. In an example, a part of the vehicle includes a license plate. In an example, a part of the vehicle includes at least one of a headlight, an emblem, a front mask, a tire, a wheel, and a painted portion of a vehicle. The video data includes occupant face video data (video data of a face of an occupant) generated by imaging a region including the face of the occupant and vehicle video data (video data of a vehicle) generated by imaging a region including a part of the vehicle. The occupant face video data and the vehicle video data is output, for example, in a form of video streams (an occupant face video stream and a vehicle video stream) independently. The monitoring device 10 is installed at a place where a face of an occupant and a vehicle can be imaged, for example, on a side of or above a road, or in a parking lot of a store.

The monitoring device 10 includes an imaging unit 12 (or an imaging unit 12a) that images the region to be monitored. Detail configurations of the imaging unit 12 and the imaging unit 12a will be described later with reference to FIGS. 2 and 9, respectively.

The video storage and analysis device 20 analyzes the video data received from the monitoring device 10 and transmits the analysis result to the terminal device 30. The video storage and analysis device 20 receives the video data from the monitoring device 10 via a network N, for example. The network N is, for example, the Internet, an intranet, or a Local Area Network (LAN). The video storage and analysis device 20 includes a video storage unit 22, a number analysis unit 24, a vehicle feature analysis unit 26, and an occupant face analysis unit 28. The video storage and analysis device 20 is, for example, a computer (information processing device) such as a Personal Computer (PC) or a workstation including a processor and a memory, and realizes functions of each component by the processor executing programs stored in the memory. The processor is, for example, at least one of a Central Processing Unit (CPU) and a Graphical Processing Unit (GPU). The processor may be an Application Specific Integrated Circuit (ASIC) or a Field-programmable Gate Array (FPGA). The analysis unit is also called a core or engine.

The video storage unit 22 temporarily stores the video data received from the monitoring device 10. Then, the video storage unit 22 outputs the stored video data in response to a read request from another device or component. The video storage unit 22 is, for example, a Random Access Memory (RAM), a flash memory, or a hard disc.

The number analysis unit 24 analyzes the vehicle video data, and obtains a search result (analysis result) indicating whether a vehicle number matches a registered vehicle number. Here, the analysis of the vehicle video data includes extracting an image of a license plate shown in a video from the vehicle video data, recognizing the number, and searching for the recognized number from a registered number list. The number analysis unit 24 recognizes the number using, for example, pattern matching or deep learning. If the numbers match, it means that a number that matches the number recognized by the number analysis unit 24 is included in the registered number list.

The number analysis unit 24 issues a notification of (outputs) the search result to the occupant face analysis unit 28. In an example, the number analysis unit 24 issues a notification of (outputs) the search result to the terminal device 30.

The vehicle feature analysis unit 26 analyzes the vehicle video data, and obtains a detection result (analysis result) indicating whether a vehicle feature matches a registered vehicle feature. Here, the analysis of the vehicle video data includes extracting an image of a part of the vehicle shown in the video from the vehicle video data, detecting the vehicle feature, and searching for the detected vehicle feature from a registered vehicle feature list. The vehicle feature to be detected is, for example, a color of the painted portion of the vehicle and/or a vehicle type. The vehicle feature analysis unit 26 detects the vehicle type based on, for example, a shape of a headlight, an emblem, a front mask, a tire, and/or a wheel around the license plate shown in the extracted image using pattern matching or deep learning. If the vehicle features match, it means that the registered vehicle feature list includes a vehicle feature that matches the vehicle feature detected by the vehicle feature analysis unit 26.

The vehicle feature analysis unit 26 issues a notification of (outputs) the detection result to the occupant face analysis unit 28. In an example, the vehicle feature analysis unit 26 issues a notification of (outputs) the detection result to the terminal device 30.

The occupant face analysis unit 28 analyzes the occupant face and obtains an analysis result. Here, the analysis of the occupant face (or occupant face video data) includes extracting an occupant face image shown in the video from the occupant face video data determined as a face image analysis target by the number analysis unit 24 and/or the vehicle feature analysis unit 26 and collating the extracted face image with a registered face image. The collating of the face image may be performed using, for example, pattern matching using feature points or deep learning. The analysis of the occupant face (or occupant face video data) further includes identifying the occupant appearing in the video based on the collating result of the face image.

In an example, the occupant face analysis unit 28 includes a storage unit (not shown) that stores the registered face image and personal information related to the occupant corresponding to the face image which are associated with each other. The personal information is, for example, at least one of a name, an address, and an age. In another example, the monitoring system 1 includes a storage device (not shown) that stores the registered face image and the personal information related to the occupant corresponding to the face image which are associated with each other and the occupant face analysis unit 28 accesses the storage device and acquires the registered face image and the personal information.

In an example, the occupant face analysis unit 28 analyzes a peripheral part of the occupant face included in the occupant face video data, for example, a color of clothes worn by the occupant. For example, the occupant face analysis unit 28 determines whether to analyze the occupant face according to the analyzed color of clothes.

Next, the occupant face analysis unit 28 issues (outputs) a notification of the identification result of the occupant face video data to the terminal device 30. The identification result includes at least one of a time when the imaging unit 12 or the imaging unit 12a takes an image, an imaging place, the image or video of the region to be monitored, and the number recognized by the number analysis unit 24, the vehicle feature analyzed by the vehicle feature analysis unit 26, the occupant face image identified by the occupant face analysis unit 28, and the information related to the occupant.

The terminal device 30 displays at least one of the number search result, the vehicle feature detection result, and the occupant identification result. The terminal device 30 is a client PC including a display device, for example. In an example, images are taken at different times by a plurality of monitoring devices 10 installed in different places, and for the occupants identified as the same by the occupant face analysis unit 28, the terminal device 30 displays a movement path of the vehicle taken by the occupant on a map. The imaging unit 12 includes, for example, a Global Positioning Satellite (GPS) terminal, and transmits position information measured by the GPS terminal to the terminal device 30. The terminal device displays the movement path of the vehicle taken by the occupant on a map based on the position information received from the imaging unit 12.

Figure 2:
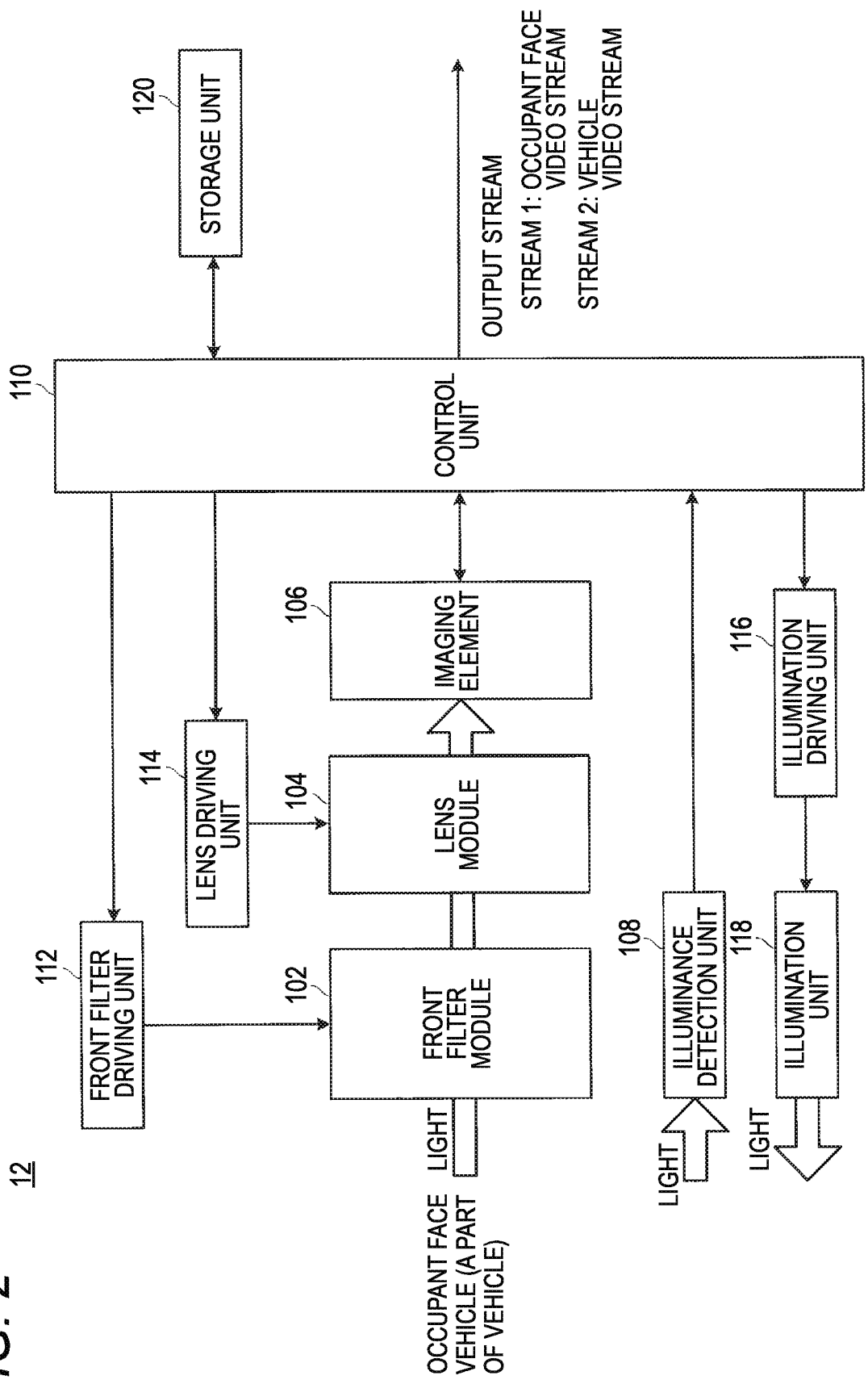
FIG. 2 is a diagram showing an example of a configuration of an imaging unit according to Embodiment 1.

FIG. 2 is a diagram showing an example of a configuration of the imaging unit 12 according to Embodiment 1.

The imaging unit 12 images the region to be monitored. The region to be monitored includes, for example, two regions, a region including a face of an occupant on a vehicle and a region including a part of the vehicle. The imaging unit 12 includes a front filter module 102, a lens module 104, an imaging element 106, an illuminance detection unit 108, a control unit 110, a front filter driving unit 112, a lens driving unit 114, an illumination driving unit 116, an illumination unit 118 and a storage unit 120.

The front filter module 102 includes filters for adjusting light incident on the lens module 104. The filters include, for example, a polarizing filter and a band-pass filter.

The lens module 104 includes a lens and in-lens filters. The lens of the lens module 104 condenses light incident from the region to be monitored via the front filter module 102 onto the imaging element 106. The in-lens filters include, for example, an Infrared-Red (IR) light cutting filter and a raw glass.

The imaging element 106 converts the light condensed by the lens into an electrical signal. The imaging element 106 is an image sensor such as a Complementary Metal-Oxide-Semiconductor (CMOS) image sensor or a Charge-Coupled Device (CCD) image sensor, for example.

The illuminance detection unit 108 detects surrounding illuminance. The illuminance detection unit 108 is, for example, a phototransistor or a photodiode.

The control unit 110 controls operation of the imaging element 106, the front filter driving unit 112, the lens driving unit 114, the illumination driving unit 116, and the storage unit 120, for example, by transmission of an electrical signal, so as to realize the function of the imaging unit 12. The control unit 110 receives the electrical signal from the imaging element 106 and outputs the occupant face video stream and the vehicle video stream. The control unit is, for example, a System on Chip (SoC) in which integrated circuits such as a Large-Scale Integrated (LSI) circuit and a CPU are integrated into one chip.

The front filter driving unit 112 switches the filters of the front filter module 102 according to control of the control unit 110. The front filter driving unit 112 includes, for example, a motor.

The lens driving unit 114 switches the in-lens filters of the lens module 104 according to control of the control unit 110. The lens driving unit 114 includes, for example, a motor.

The illumination driving unit 116 drives the illumination unit 118 according to control of the control unit 110. The driving of the illumination unit 118 is, for example, turning on and off nighttime short wavelength illumination provided in the illumination unit 118.

The illumination unit 118 is turned on and off according to the driving of the illumination driving unit 116. The illumination unit 118 is, for example, a Light Emitting Diode (LED).

The storage unit 120 temporarily stores video data. In an example, the storage unit 120 temporarily stores information indicating shutter driving settings. The storage unit 120 is at least one storage device that stores data, such as a Random Access Memory (RAM) or a flash memory card.

Figure 3:
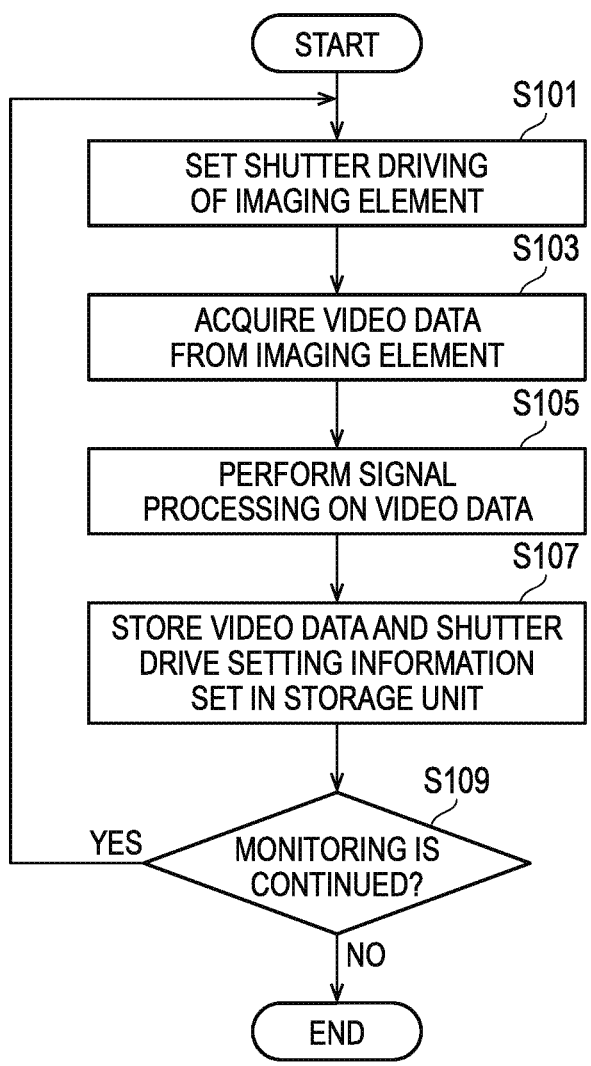
FIG. 3 is a flowchart showing an example of imaging operation of the imaging unit according to Embodiment 1.

FIG. 3 is a flowchart showing an example of imaging operation of the imaging unit 12 according to Embodiment 1.

In step S101, the control unit 110 sets shutter driving of the imaging element 106. The shutter drive settings include a length of an exposure time. In an example, the control unit 110 alternately switches the length of the exposure time in step S101 which is repeatedly executed.

In step S103, the control unit 110 acquires video data from the imaging element 106. The video data includes video data of a region including the face of an occupant on a vehicle and video data of a region including a part of the vehicle.

In step S105, the control unit 110 performs signal processing on the video data. The signal processing is at least one of noise removal, brightness correction, and clipping, for example.

In step S107, the control unit 110 causes the storage unit 120 to store the video data subjected to signal processing in step S105 and the shutter drive setting information set in step S101. The setting information includes, for example, a 1-bit value indicating the length of the exposure time.

In step S109, the control unit 110 determines whether to continue monitoring of the monitoring system 1. For example, the control unit 110 determines that monitoring of the monitoring system 1 is continued while the monitoring system 1 is in operation, and determines that the monitoring of the monitoring system 1 is not continued while the monitoring system 1 is shutdown.

If the monitoring is continued (step S109: Yes), the control unit 110 repeats step S101 and subsequent steps. On the contrary, if the monitoring is not continued (step S109: No), the control unit 110 ends the processing.

Figure 4:
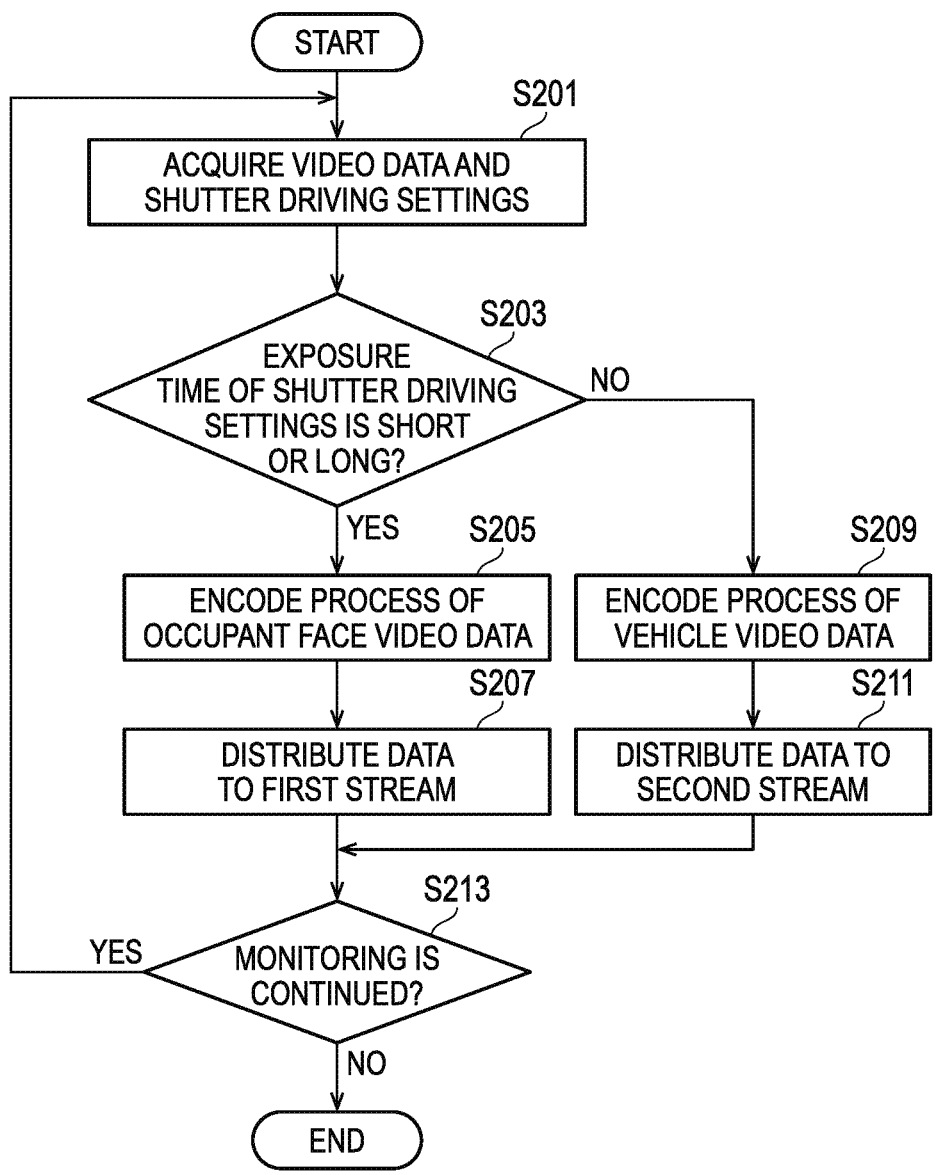
FIG. 4 is a flowchart showing an example of streaming operation of the imaging unit according to Embodiment 1.

FIG. 4 is a flowchart showing an example of streaming operation of the imaging unit 12 according to Embodiment 1.

In step S201, the control unit 110 acquires the video data and shutter driving settings stored in the storage unit 120 in step S107 of FIG. 3.

In step S203, the control unit 110 determines whether the exposure time of the shutter driving settings is short or long. The determination is made based on, for example, a 1-bit value indicating the length of the exposure time of the shutter driving settings.

If the exposure time is short (step S203: Yes), in step S205, the control unit 110 encodes the occupant face video data in a stream format. Examples of the stream format include MPEG-1, MPEG-2, MPEG-4, H.264, H.265, or JPEG.

Next, in step S207, the control unit 110 distributes (or assigns, allocates, and sorts) the encoded occupant face video data to a first stream (Stream 1) and the processing proceeds to step S213.

On the contrary, if the exposure time is long (step S203: No), in step S209, the control unit 110 encodes the vehicle video data in a stream format.

Next, in step S211, the control unit 110 distributes (or assigns, allocates, and sorts) the encoded vehicle video data to a second stream (Stream 2) and the processing proceeds to step S213.

In step S213, the control unit 110 determines whether to continue the monitoring of the monitoring system 1. For example, the control unit 110 determines that monitoring of the monitoring system 1 is continued while the monitoring system 1 is in operation, and determines that the monitoring of the monitoring system 1 is not continued while the monitoring system 1 is shutdown.

If the monitoring is continued (step S213: Yes), the control unit 110 repeats step S201 and subsequent steps. On the contrary, if the monitoring is not continued (step S213: No), the control unit 110 ends the processing.

Figure 5:
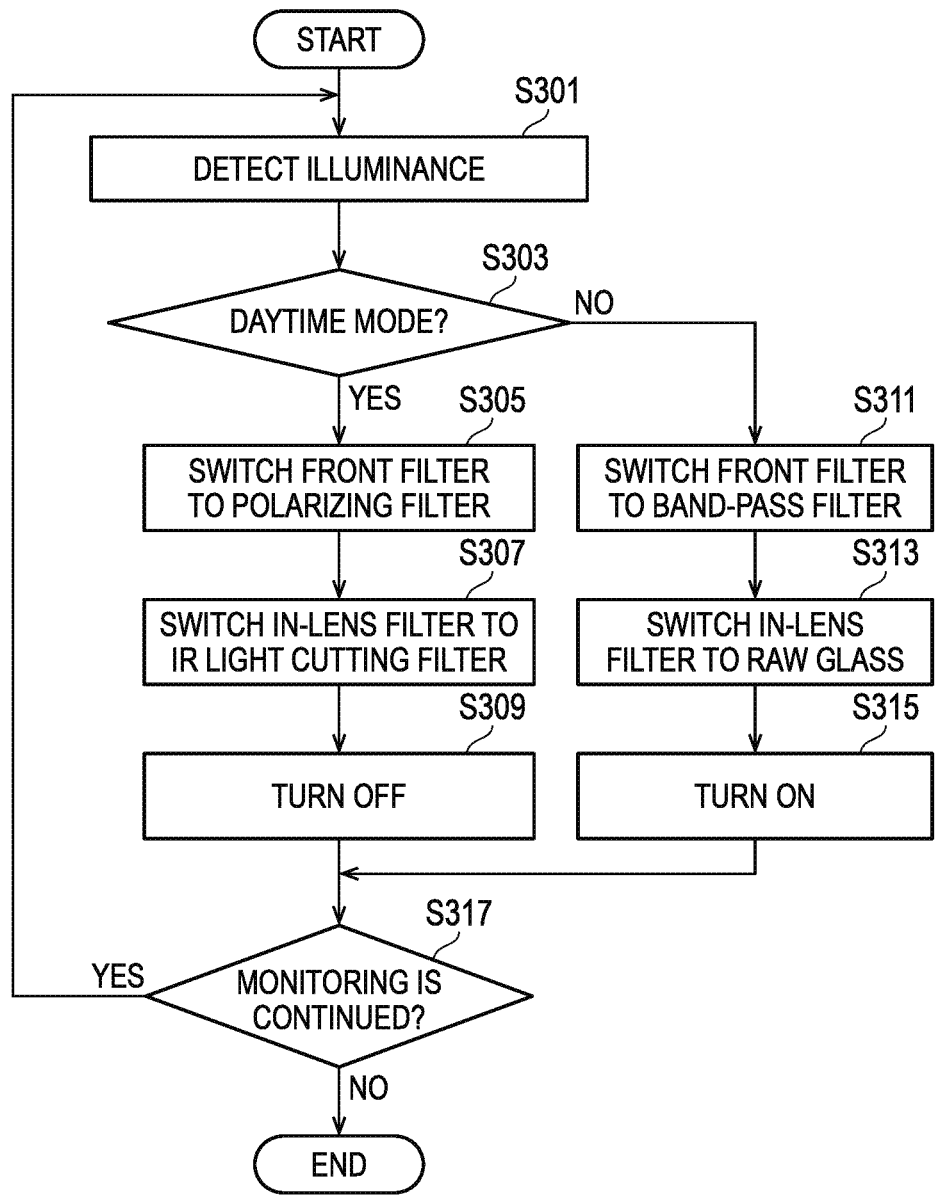
FIG. 5 is a flowchart showing an example of driving operation of the imaging unit according to Embodiment 1.

FIG. 5 is a flowchart showing an example of driving operation of the imaging unit 12 according to Embodiment 1.

In step S301, the illuminance detection unit 108 detects illuminance.

In step S303, the control unit 110 determines whether the imaging unit 12 operates in a daytime mode or in a nighttime mode, based on the illuminance detected by the illuminance detection unit 108. For example, if the illuminance detected by the illuminance detection unit 108 is larger than a first threshold, the control unit 110 determines that the imaging unit 12 operates in the daytime mode. If the illuminance detected by the illuminance detection unit 108 is smaller than a second threshold, the control unit 110 determines that the imaging unit 12 operates in the nighttime mode. The first threshold and the second threshold may be the same or different.

If the imaging unit 12 operates in the daytime mode (step S303: Yes), in step S305, the front filter driving unit 112 switches a front filter of the front filter module 102 to a polarizing filter.

Next, in step S307, the lens driving unit 114 switches the in-lens filter provided in the lens module 104 to the IR light cutting filter.

Next, in step S309, the illumination driving unit 116 turns off the illumination unit 118 and the processing proceeds to step S317.

On the contrary, if the imaging unit 12 operates in the nighttime mode (step S303: No), in step S311, the front filter driving unit 112 switches the front filter of the front filter module 102 to the band-pass filter.

Next, in step S313, the lens driving unit 114 switches the in-lens filter to the raw glass.

Next, in step S315, the illumination driving unit 116 turns on the illumination unit 118 and the processing proceeds to step S317.

In step S317, the control unit 110 determines whether to continue the monitoring of the monitoring system 1. For example, the control unit 110 determines that the monitoring of the monitoring system 1 is continued while the monitoring system 1 is in operation, and determines that the monitoring of the monitoring system 1 is not continued while the monitoring system 1 is shutdown.

If the monitoring is continued (step S317: Yes), step S301 and subsequent steps are repeated. On the contrary, if the monitoring is not continued (step S317: No), the processing ends.

Figure 6:
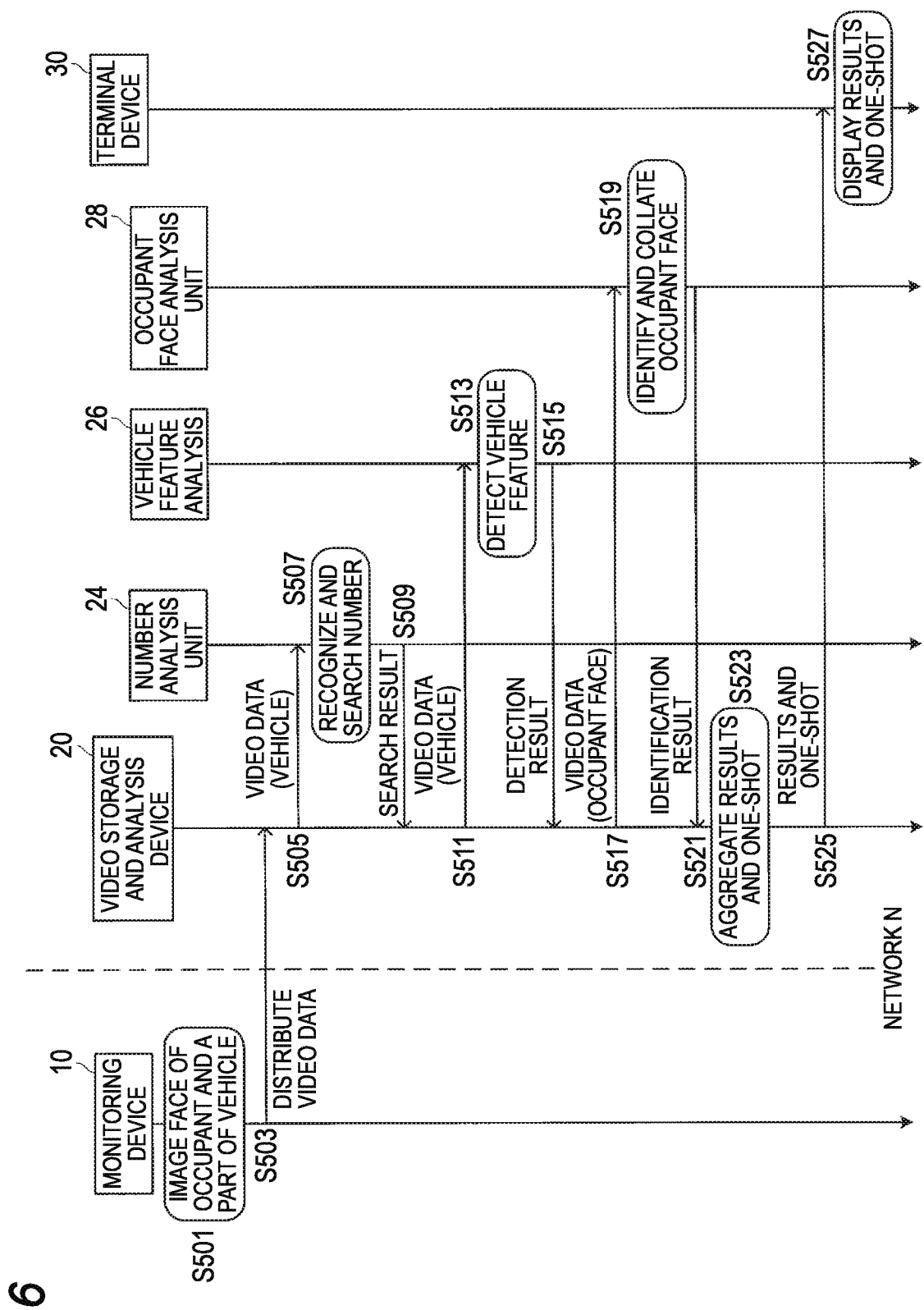
FIG. 6 is a sequence diagram showing an example of operation of the monitoring system according Embodiment 1.

FIG. 6 is a sequence diagram showing an example of operation of the monitoring system 1 according to Embodiment 1. In the operation shown in FIG. 6, the video storage and analysis device 20 transmits (for example, push transmission) the video data to the number analysis unit 24, the vehicle feature analysis unit 26, or the occupant face analysis unit 28.

In step S501, the monitoring device 10 images a face of an occupant on a vehicle and a part of the vehicle included the region to be monitored.

In step S503, the monitoring device 10 transmits (distributes) the video data to the video storage and analysis device 20 via the network N.

In step S505, the video storage and analysis device 20 transmits the vehicle video data to the number analysis unit 24.

In step S507, the number analysis unit 24 recognizes the number shown in the vehicle video data and searches for the recognized number from the registered number list.

In step S509, the number analysis unit 24 notifies the video storage and analysis device 20 of the search result indicating whether the numbers match.

In step S511, the video storage and analysis device 20 transmits the vehicle video data to the vehicle feature analysis unit 26. In an example, the video storage and analysis device 20 transmits the vehicle video data to the vehicle feature analysis unit 26 if the numbers match. In another example, the video storage and analysis device 20 transmits the vehicle video data to the vehicle feature analysis unit 26 even if the numbers do not match.

In step S513, the vehicle feature analysis unit 26 detects the vehicle feature based on the vehicle video data.

In step S515, the vehicle feature analysis unit 26 notifies the video storage and analysis device 20 of the detection result indicating whether the vehicle features match.

In step S517, the video storage and analysis device 20 transmits the occupant face video data to the occupant face analysis unit 28. In an example, the video storage and analysis device 20 transmits the occupant face video data to the occupant face analysis unit 28 if the numbers match. In another example, the video storage and analysis device 20 transmits the occupant face video data to the occupant face analysis unit 28 if the vehicle features match. In still another example, the video storage and analysis device 20 transmits the occupant face video data to the occupant face analysis unit 28 if the numbers and the vehicle features match respectively.

In step S519, the occupant face analysis unit 28 identifies the occupant shown in the video based on the occupant face video data.

In step S521, the occupant face analysis unit 28 transmits the identification result indicating whether the occupant is identified to the video storage and analysis device 20.

In step S523, the video storage and analysis device 20 aggregates the search result, the detection result, the identification result, and a one-shot. Here, the one-shot is, for example, one image by which the occupant face is successfully identified among images included in the occupant face video data. Aggregation refers to associating the search result, the detection result, the identification result, and the one-shot with time-matching information based on information indicating time, such as time stamps and frame numbers.

In step S525, the video storage and analysis device 20 transmits the aggregated search result, detection result, identification result, and one-shot to the terminal device 30.

In step S527, the terminal device 30 displays the aggregated search result, detection result, identification result, and one-shot and the processing ends.

The order in which steps S505 to S509 and steps S511 to S515 is executed may be reversed, or may be simultaneous (parallel execution). In this case, in an example, the video storage and analysis device 20 transmits the vehicle video data to the number analysis unit 24 if the vehicle features match, in step S505. In another example, the video storage and analysis device 20 transmits the vehicle video data to the number analysis unit 24 even if the vehicle features do not match.

According to the operation shown in FIG. 6, when the occupant face is not an identification target, the occupant face analysis unit 28 does not receive the occupant face video data. That is, the occupant face analysis unit 28 does not collate the occupant face unless the number shown in the vehicle video data matches the number in the registered number list and/or the vehicle feature shown in the vehicle video data matches the vehicle feature in the registered vehicle feature list. Therefore, the possibility of privacy infringement by the occupant face analysis unit 28 can be further reduced.

Figure 7:
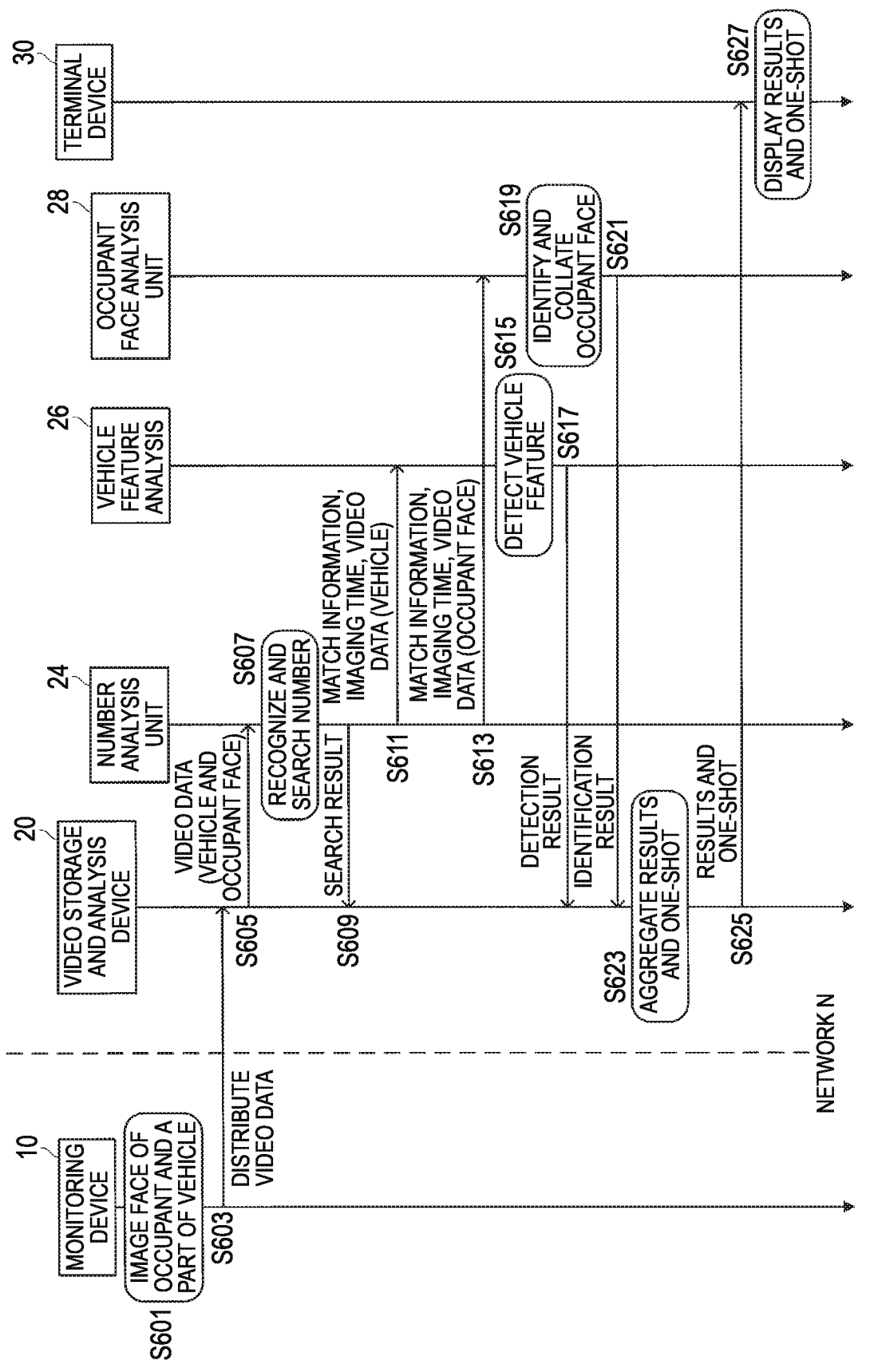
FIG. 7 is a sequence diagram showing another example of the operation of the monitoring system according to Embodiment 1.

FIG. 7 is a sequence diagram showing another example of the operation of the monitoring system 1 according to Embodiment 1. In the operation shown in FIG. 7, the video data is directly transferred among the number analysis unit 24, the vehicle feature analysis unit 26, and the occupant face analysis unit 28.

In step S601, the monitoring device 10 images a face of an occupant on a vehicle and a part of the vehicle included the region to be monitored.

In step S603, the monitoring device 10 transmits (distributes) video data to the video storage and analysis device 20 via the network N.

In step S605, the video storage and analysis device 20 transmits the vehicle video data and the occupant face video data to the number analysis unit 24.

In step S607, the number analysis unit 24 recognizes the number and searches for the recognized number from the registered number list.

In step S609, the number analysis unit 24 notifies the video storage and analysis device 20 of the search result indicating whether the numbers match.

In step S611, if the numbers match, the number analysis unit 24 transmits the vehicle video data to the vehicle feature analysis unit 26 together with a notification indicating that the numbers match and information indicating an imaging time of the vehicle video data.

In step S613, if the numbers match, the number analysis unit 24 transmits the vehicle video data to the occupant face analysis unit 28 together with the notification indicating that the numbers match and the information indicating the imaging time of the vehicle video data. The order in which step S611 and step S613 are executed may be reversed, or may be simultaneous (parallel execution).

In step S615, the vehicle feature analysis unit 26 detects the vehicle feature based on the vehicle video data.

In step S617, the vehicle feature analysis unit 26 notifies the video storage and analysis device 20 of the detection result indicating whether the vehicle features match.

In step S619, the occupant face analysis unit 28 identifies the occupant shown in the video based on the occupant face video data. The order in which step S615 and step S619 are executed may be reversed, or may be simultaneous (parallel execution).

In step S621, the occupant face analysis unit 28 transmits the identification result indicating whether the occupant is identified to the video storage and analysis device 20. The order in which step S617 and step S621 are executed may be reversed, or may be simultaneous (parallel execution).

In step S623, the video storage and analysis device 20 aggregates the search result, the detection result, the identification result, and a one-shot.

In step S625, the video storage and analysis device 20 transmits the aggregated search result, detection result, identification result, and one-shot to the terminal device 30.

In step S627, the terminal device 30 displays the aggregated search result, detection result, identification result, and one-shot.

According to the operation shown in FIG. 7, the video data is directly transferred among the number analysis unit 24, the vehicle feature analysis unit 26, and the occupant face analysis unit 28. Therefore, a load of the video data transfer processing can be reduced, and parallel operation of the number analysis unit 24, the vehicle feature analysis unit 26, and the occupant face analysis unit 28 is easier.

Figure 8:
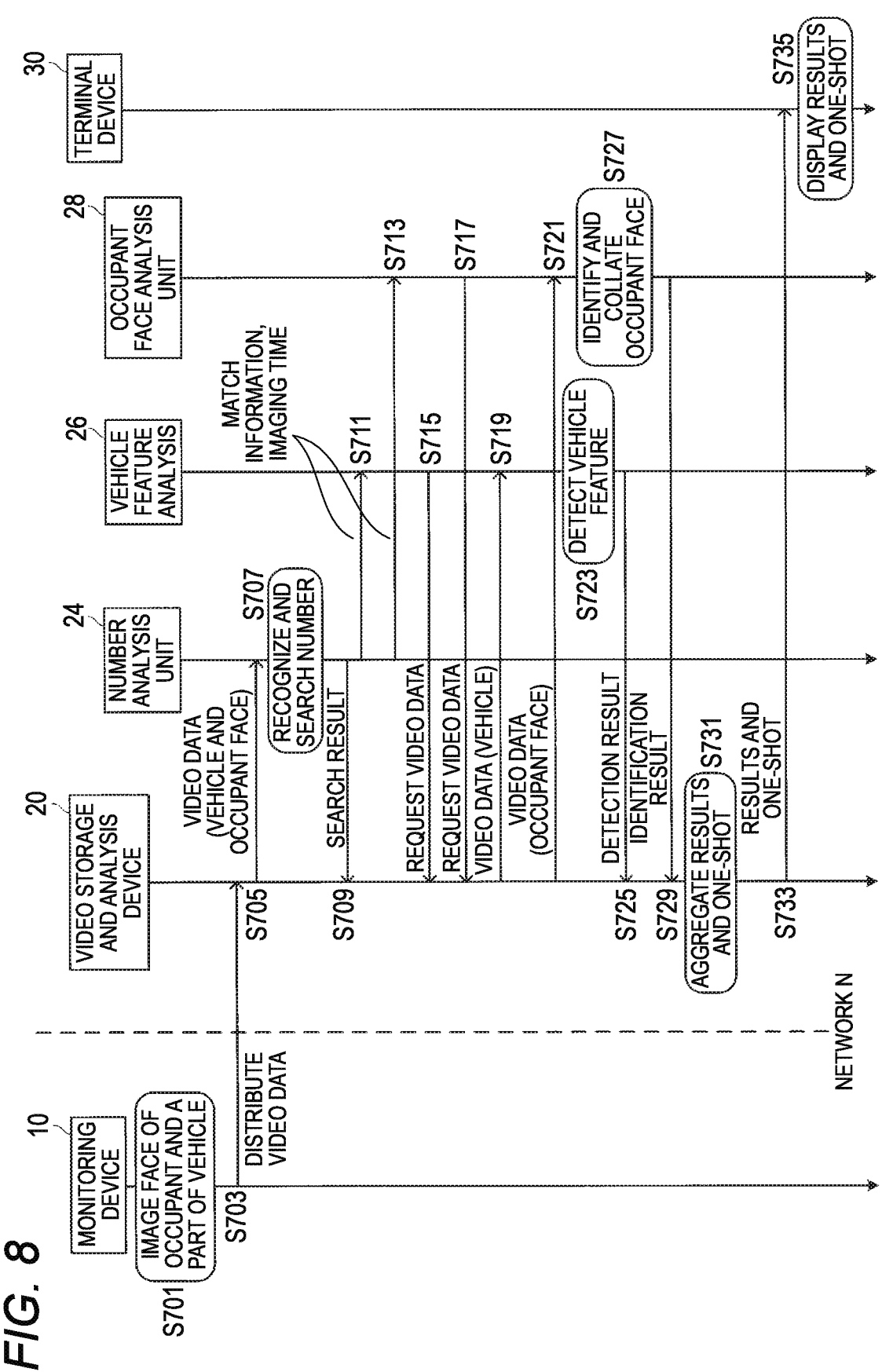
FIG. 8 is a sequence diagram showing still another example of the operation of the monitoring system according to Embodiment 1.

FIG. 8 is a sequence diagram showing still another example of the operation of the monitoring system 1 according to Embodiment 1. In the operation shown in FIG. 8, the video storage and analysis device 20 transmits the video data in response to a request from the number analysis unit 24, the vehicle feature analysis unit 26, or the occupant face analysis unit 28.

In step S701, the monitoring device 10 images a face of an occupant on a vehicle and a part of the vehicle included the region to be monitored.

In step S703, the monitoring device 10 transmits (distributes) video data to the video storage and analysis device 20 via the network N.

In step S705, the video storage and analysis device 20 transmits the vehicle video data and the occupant face video data to the number analysis unit 24.

In step S707, the number analysis unit 24 recognizes the number and searches for the recognized number from the registered number list.

In step S709, the number analysis unit 24 notifies the video storage and analysis device 20 of the search result indicating whether the numbers match.

In step S711, if the numbers match, the number analysis unit 24 transmits a notification indicating that the numbers match and information indicating an imaging time of the vehicle video data to the vehicle feature analysis unit 26.

In step S713, if the numbers match, the number analysis unit 24 transmits the notification indicating that the numbers match and the information indicating the imaging time of the vehicle video data to the occupant face analysis unit 28. The order in which step S711 and step S713 are executed may be reversed, or may be simultaneous (parallel execution).

In step S715, the vehicle feature analysis unit 26 requests the vehicle video data from the image storage and analysis device 20.

In step S717, the occupant face analysis unit 28 requests the occupant face video data from the image storage and analysis device 20. The order in which step S715 and step S717 are executed may be reversed, or may be simultaneous (parallel execution).

In step S719, the video storage and analysis device 20 transmits the requested vehicle video data to the vehicle feature analysis unit 26.

In step S721, the video storage and analysis device 20 transmits the occupant face video data to the occupant face analysis unit 28 if the numbers match. The order in which step S719 and step S721 are executed may be reversed, or may be simultaneous (parallel execution).

In step S723, the vehicle feature analysis unit 26 detects the vehicle feature based on the vehicle video data.

In step S725, the vehicle feature analysis unit 26 notifies the video storage and analysis device 20 of the detection result indicating whether the vehicle features match.

In step S727, the occupant face analysis unit 28 identifies the occupant shown in the video based on the occupant face video data. The order in which step S723 and step S727 are executed may be reversed, or may be simultaneous (parallel execution).

In step S729, the occupant face analysis unit 28 transmits the identification result indicating whether the occupant is identified to the video storage and analysis device 20. The order in which step S725 and step S729 are executed may be reversed, or may be simultaneous (parallel execution).

In step S731, the video storage and analysis device 20 aggregates the search result, the detection result, the identification result, and a one-shot. In an example, the video storage and analysis device 20 executes step S731 when the numbers match. In another example, the video storage and analysis device 20 executes step S731 when the vehicle features match. In still another example, the video storage and analysis device 20 executes step S731 when the numbers and the vehicle features match.

In step S733, the video storage and analysis device 20 transmits the aggregated search result, detection result, identification result, and one-shot to the terminal device 30.

In step S735, the terminal device 30 displays the aggregated search result, detection result, identification result, and one-shot.

In the operation shown in FIG. 8, the video storage and analysis device 20 transmits the video data in response to a request from the number analysis unit 24, the vehicle feature analysis unit 26, or the occupant face analysis unit 28. Therefore, it is easier for the number analysis unit 24, the vehicle feature analysis unit 26, or the occupant face analysis unit 28 to adjust the processing timing according to respective load states.

According to the monitoring system 1 of Embodiment 1, the occupant face is the identification target, but the occupant face analysis unit 28 does not analyze the occupant face video data to identify the occupant face unless indicated by the analysis result of the number analysis unit 24 or the vehicle feature analysis unit 26. Therefore, the monitoring system 1 makes it easier to protect the occupant privacy as compared with a case of analyzing the occupant face video data of all occupants.

According to the imaging unit 12 of Embodiment 1, since two video streams having different exposure times are obtained, video streams corresponding to different exposure times can be appropriately used according to the analysis target. For example, by setting the exposure time of the video stream used for analysis of the relatively bright license plate short, and by setting the exposure time of the video stream used for analysis of the occupant face in a relatively dark vehicle, the accuracy of analyzing the video stream can be improved. Further, the imaging unit 12 has one imaging element 106 and can save costs as compared with a case of having a plurality of imaging elements.

(Modification 1)

The imaging unit 12 according to Embodiment 1 has one imaging element 106. In contrast, Modification 1 using a plurality of imaging elements is also conceivable.

Figure 9:
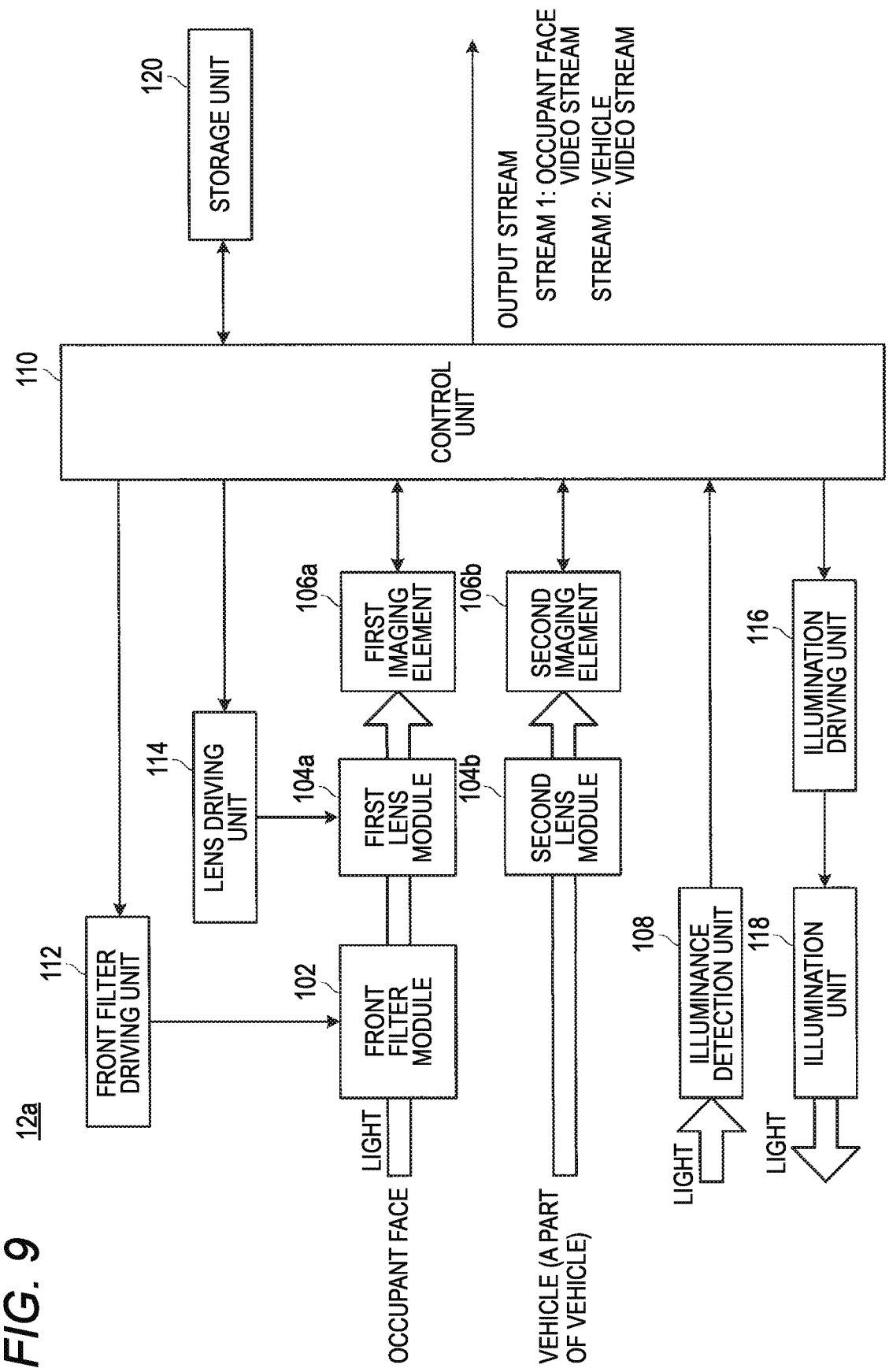
FIG. 9 is a diagram showing an example of a configuration of an imaging unit according to Modification 1.

FIG. 9 is a diagram showing an example of a configuration of the imaging unit 12a according to Modification 1.

The imaging unit 12a images a region to be monitored. The monitoring device 10 includes the front filter module 102, a first lens module 104a, a second lens module 104b, a first imaging element 106a, a second imaging element 106b, an illuminance detection unit 108, a control unit 110, a front filter driving unit 112, a lens driving unit 114, an illumination driving unit 116, an illumination unit 118 and a storage unit 120. The imaging unit 12a is different from the imaging unit 12 in that the imaging unit 12a includes the first lens module 104a, the second lens module 104b, the first imaging element 106a, and the second imaging element 106b. Description of common points of the imaging unit 12 and the imaging unit 12a will be omitted.

The first lens module 104a includes a lens and in-lens filters. The lens of the first lens module 104a condenses light incident from the region to be monitored via the front filter module 102 onto the imaging element 106. The region to be monitored includes, for example, a region including a face of an occupant on a vehicle. The in-lens filters include, for example, an Infrared-Red (IR) light cutting filter and a raw glass.

The second lens module 104b includes a lens and in-lens filters. The lens of the second lens module 104b condenses light incident from the region to be monitored via the front filter module 102 onto the imaging element 106. The region to be monitored includes, for example, a region including a part of the vehicle. The in-lens filters include, for example, an Infrared-Red (IR) light cutting filter and a raw glass.

The first and second imaging elements 106a, 106b convert the light condensed by each lens into an electrical signal. The imaging element 106 is an image sensor such as a CMOS image sensor or a CCD image sensor, for example.

Figure 10:
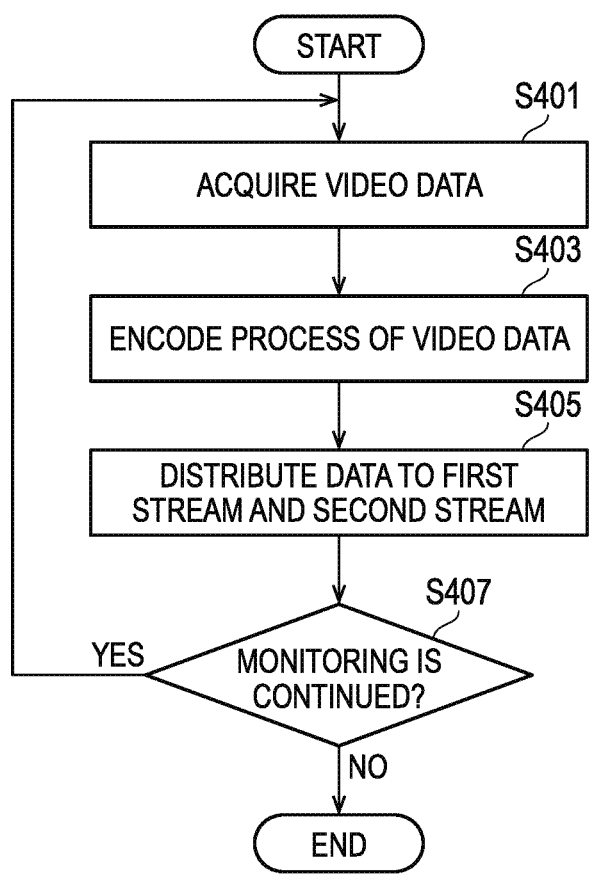
FIG. 10 is a flowchart showing an example of streaming operation of the imaging unit according to Modification 1.

FIG. 10 is a flowchart showing an example of streaming operation of the imaging unit 12a according to Modification 1.

In step S401, the control unit 110 acquires the video data stored in the storage unit 120 in step S107 of FIG. 3.

In step S403, the control unit 110 encodes the vehicle video data and the occupant face video data in a stream format. Examples of the stream format include MPEG-1, MPEG-2, MPEG-4, H.264, H.265, or JPEG.

Next, in step S405, the control unit 110 distributes (or assigns, allocates, and sorts) the encoded occupant face video data and vehicle video data into a first stream (Stream 1) and a second stream (Stream 2) respectively.

In step S407, the control unit 110 determines whether to continue the monitoring of the monitoring system 1. For example, the control unit 110 determines that monitoring of the monitoring system 1 is continued while the monitoring system 1 is in operation, and determines that the monitoring of the monitoring system 1 is not continued while the monitoring system 1 is shutdown.

If the monitoring is continued (step S407: Yes), step S401 and subsequent steps are repeated. On the contrary, if the monitoring is not continued (step S407: No), the processing ends.

The imaging operation flow shown in FIG. 3 can also be applied to Modification 1 except that the shutter driving settings are stored in step S107. The driving operation flow shown in FIG. 5 can also be applied to Modification 1.

The imaging unit 12*a* according to Modification 1 has a plurality of imaging elements 106*a*, 106*b*, a frame rate can be increased as compared with the case where one imaging element is provided, and the imaging unit 12*a* can also be applied to a vehicle that travels at a higher speed.

(Modification 2)

The imaging unit 12 according to Embodiment 1 or the imaging unit 12*a* according to Modification 1 each outputs two video streams. Meanwhile, Modification 2 in which a plurality of imaging units or imaging devices (not shown) each output one video stream is also conceivable. The plurality of imaging units or imaging devices may be connected to the video storage and analysis device 20 via the network N. For example, one imaging device is provided outside and in a store respectively, the imaging device provided outside the store (for example, an outdoor security camera) outputs a vehicle video stream, and the imaging device (for example, an indoor security camera) provided in the store outputs an occupant face video stream (face video stream). According to Modification 2, the occupant face video data (face video data) can be analyzed using the face video stream imaged in a bright environment in the store while taking into account the privacy infringement of customers who visit the store and occupants of the vehicle.

(Embodiment 2)

Figure 11:
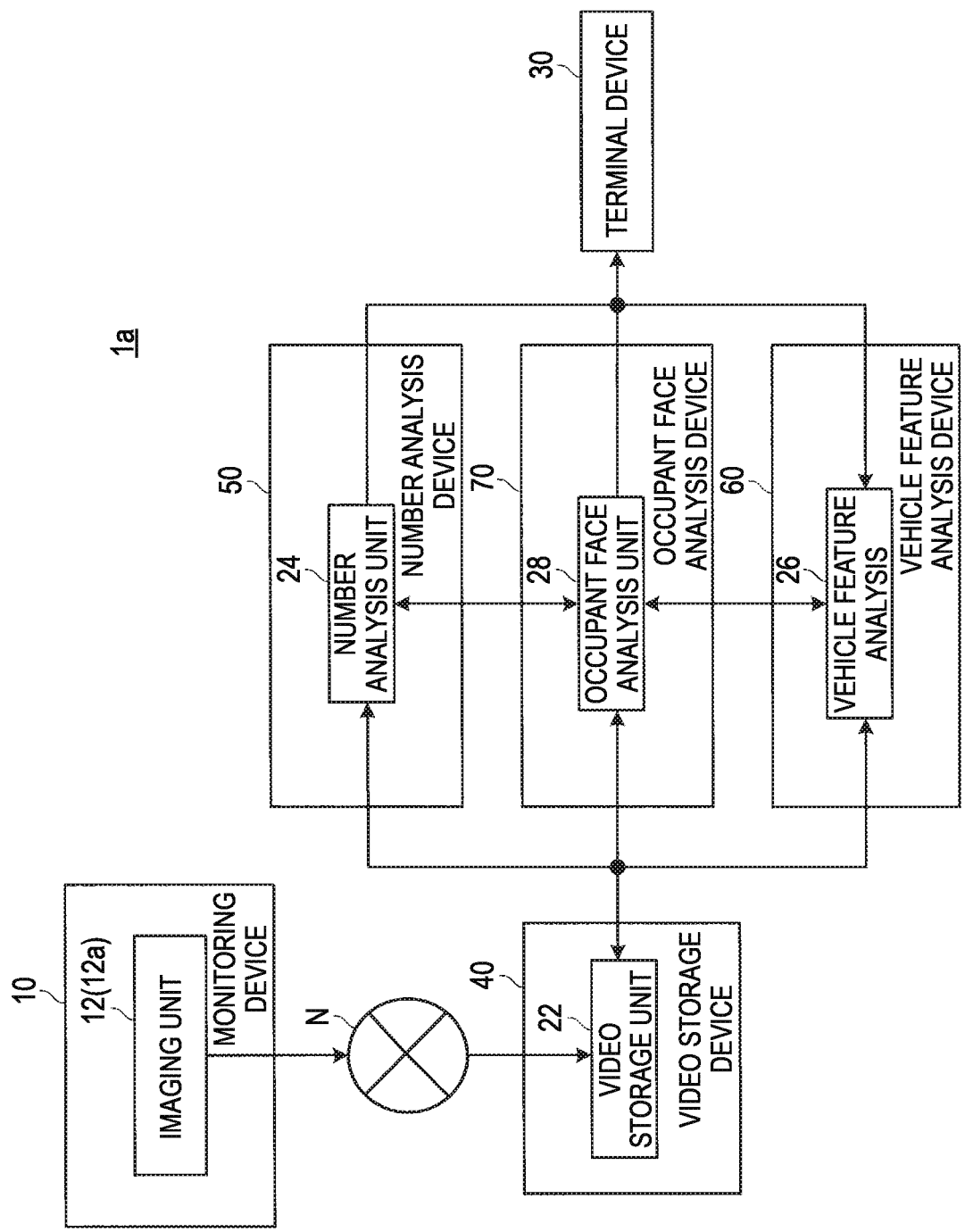
FIG. 11 is a diagram showing an example of a configuration of a monitoring system according to Embodiment 2.

FIG. 11 is a diagram showing an example of a configuration of a monitoring system 1*a* according to Embodiment 2.

The monitoring system 1*a* includes the monitoring device (imaging device) 10, the terminal device 30, a video storage device 40, a number analysis device 50, a vehicle feature analysis device 60, and an occupant face analysis device (identification device) 70.

The monitoring system 1*a* is different from the monitoring system 1 in that the terminal device 30, the video storage device 40, the number analysis device 50, the vehicle feature analysis device 60 and the occupant face analysis device 70 are provided individually. Description of common points of the monitoring system 1 and the monitoring system 1*a* will be omitted.

The video storage device 40 temporarily stores the video data received from the monitoring device 10. Next, the video storage device 40 outputs the stored video data to the number analysis device 50, the vehicle feature analysis device 60 and the occupant face analysis device 70. The video storage device 40 includes the video storage unit 22. The video storage unit 22 has the same configuration as the video storage unit 22 of the monitoring system 1 according to Embodiment 1. The video storage device 40 is, for example, a Solid State Drive (SSD).

The number analysis device 50 determines whether occupant face video data is a face image analysis target based on vehicle video data. The number analysis device 50 includes the number analysis unit 24. The number analysis unit 24 has the same configuration as the number analysis unit 24 of the monitoring system 1 according to Embodiment 1.

The vehicle feature analysis device 60 determines whether the occupant face video data is a face image analysis target based on the vehicle video data. The vehicle feature analysis device 60 includes the vehicle feature analysis unit 26. The vehicle feature analysis unit 26 has the same configuration as the vehicle feature analysis unit 26 of the monitoring system 1 according to Embodiment 1.

The occupant face analysis device 70 analyzes the occupant face video data determined as the face image analysis target by the number analysis device 50 and/or the vehicle feature analysis device 60. The occupant face analysis device 70 includes the occupant face analysis unit 28. The occupant face analysis unit 28 has the same configuration as the occupant face analysis unit 28 of the monitoring system 1 according to Embodiment 1.

Each of the video storage device 40, the number analysis device 50, the vehicle feature analysis device 60, and the occupant face analysis device 70 is a server computer such as a PC or a workstation including a CPU or GPU and a memory, for example, and the function of each component is realized by the CPU or GPU executing the programs stored in the memory.

The operation of the video storage and analysis device 20 is implemented by, for example, execution of the occupant face analysis device 70, so that each component of the monitoring system 1*a* can also operate according to the sequence diagram described above with reference to FIGS. 6 to 8 in Embodiment 2.

According to Embodiment 2, the number analysis, the vehicle feature analysis, and the occupant face analysis are performed by devices provided separately. Therefore, the configuration of the processor and memory provided in each device can be optimized according to each analysis operation. In the monitoring system 1*a*, the terminal device 30, the video storage device 40, the number analysis device 50, the vehicle feature analysis device 60, and the occupant face analysis device 70 are provided individually, but at least two of these devices may be provided in a common device.

(Embodiment 3)

Figure 12:
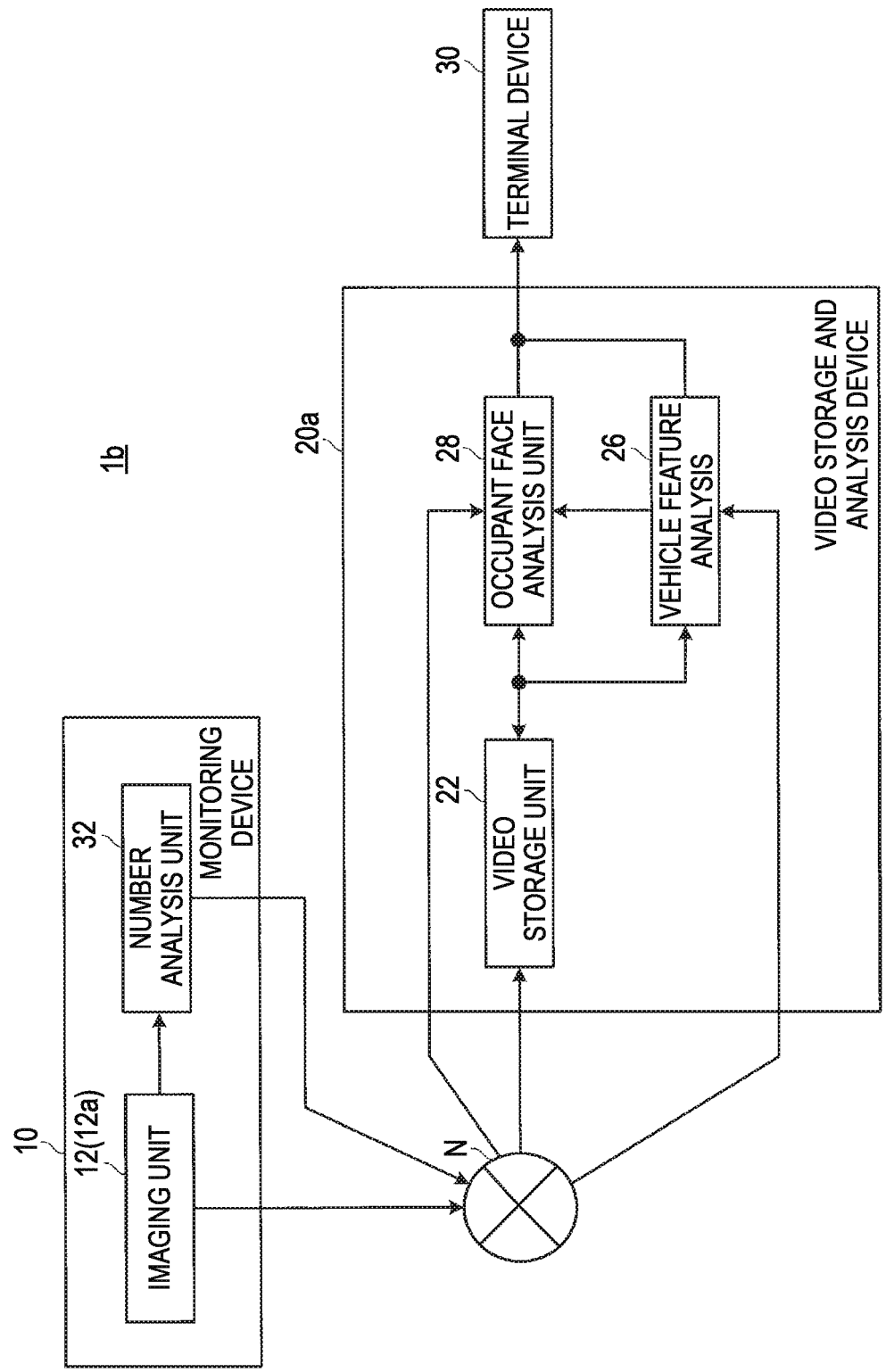
FIG. 12 is a diagram showing an example of a configuration of a monitoring system according to Embodiment 3.

FIG. 12 is a diagram showing an example of a configuration of a monitoring system 1*b* according to Embodiment 3.

The monitoring system 1*b* includes a monitoring device (imaging device) 10*a*, a video storage and analysis device (identification device) 20*a*, and the terminal device 30. The monitoring system 1*b* is different from the monitoring system 1 in that the monitoring system 1*b* includes the monitoring device 10*a*, and the video storage and analysis device 20*a*. Description of common points of the monitoring system 1 and the monitoring system 1*b* will be omitted.

The monitoring device 10*a* images a region to be monitored and outputs video data. Further, the monitoring device 10*a* determines whether occupant face video data is a face image analysis target based on the vehicle video data. The monitoring device 10*a* notifies the video storage and analysis device 20*a* of the determination result.

The monitoring device 10*a* includes the imaging unit 12 (or the imaging unit 12*a*) and a number analysis unit 32. The imaging unit 12 (or the imaging unit 12*a*) and the number analysis unit 32 of the monitoring device 10*a* have the same configurations as the imaging unit 12 (or the imaging unit 12*a*) and the number analysis unit 24 of the monitoring device 10 according to Embodiment 1, respectively.

The video storage and analysis device 20*a* includes the video storage unit 22, the vehicle feature analysis unit 26, and the occupant face analysis unit 28. The video storage unit 22, the occupant face analysis unit 28, and the vehicle feature analysis unit 26 of the video storage and analysis device 20a have the same configurations as the video storage unit 22 and the occupant face analysis unit 28 and the vehicle feature analysis unit 26 of the video storage and analysis device 20 according to Embodiment 1, respectively.

Figure 13:
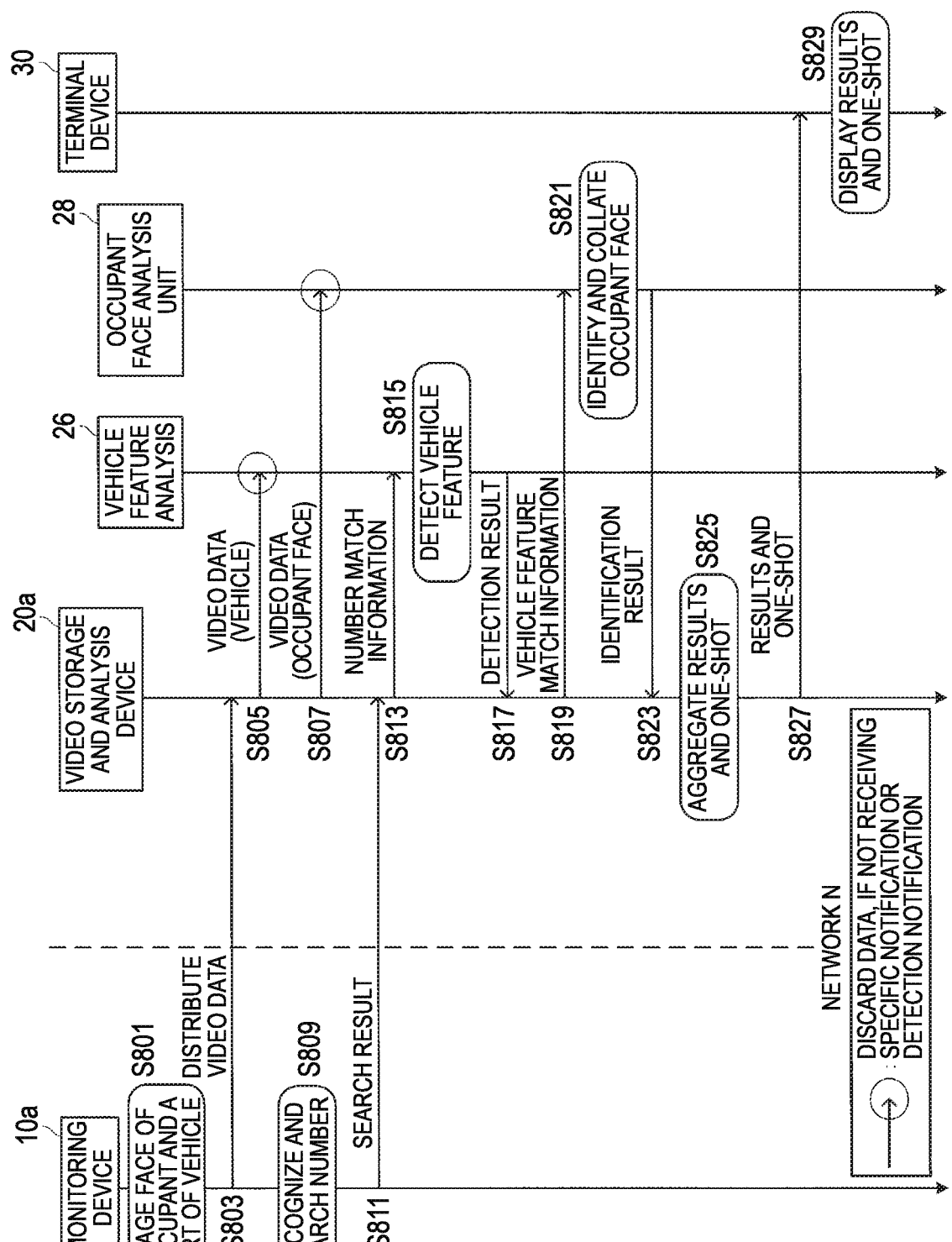
FIG. 13 is a sequence diagram showing an example of operation of the monitoring system according to Embodiment 3.

FIG. 13 is a sequence diagram showing an example of operation of the monitoring system 1b according to Embodiment 3.

In step S801, the monitoring device 10a images a face of an occupant on a vehicle and a part of the vehicle included the region to be monitored.

In step S803, the monitoring device 10 transmits (distributes) the video data to the video storage and analysis device 20a via the network N.

In step S805, the video storage and analysis device 20a transmits vehicle video data to the vehicle feature analysis unit 26. Here, as shown in FIG. 13, if the vehicle feature analysis unit 26 does not receive a notification (number match notification) indicating that the numbers match, the vehicle feature analysis unit 26 discards the received vehicle video data.

In step S807, the video storage and analysis device 20 transmits the occupant face video data to the occupant face analysis unit 28. Here, as shown in FIG. 13, if the occupant face analysis unit 28 does not receive a notification (vehicle feature match notification) indicating that the vehicle features match, the occupant face analysis unit 28 discards the received occupant face video data. The order in which step S805 and step S807 are executed may be reversed, or may be simultaneous (parallel execution).

In step S809, the number analysis unit 32 of the monitoring device 10a recognizes the number and searches for the recognized number from a registered number list.

In step S811, the number analysis unit 32 of the monitoring device 10a notifies the video storage and analysis device 20a of the search result indicating whether the numbers match.

In step S813, if the search result indicates that the numbers match, the vehicle feature analysis unit 26 is notified of the number match notification.

In step S815, the vehicle feature analysis unit 26 detects a vehicle feature based on the vehicle video data.

In step S817, the vehicle feature analysis unit 26 notifies the video storage and analysis device 20a of the detection result indicating whether the vehicle features match.

In step S819, if the detection result indicates that the vehicle numbers match, the occupant face analysis unit 28 is notified of the vehicle feature match notification.

In step S821, the occupant face analysis unit 28 identifies the occupant shown in the video based on the occupant face video data.

In step S823, the occupant face analysis unit 28 transmits the identification result indicating whether the occupant is identified to the video storage and analysis device 20a.

In step S825, the video storage and analysis device 20a aggregates the search result, the detection result, the identification result, and a one-shot.

In step S827, the video storage and analysis device 20a transmits the aggregated search result, detection result, identification result, and one-shot to the terminal device 30.

In step S829, the terminal device 30 displays the aggregated search result, detection result, identification result, and one-shot.

According to Embodiment 3, the monitoring device 10a and the video storage and analysis device 20a are provided separately and are connected via the network N. Therefore, the video storage and analysis device 20a can be more easily connected to a number of monitoring devices 10a as compared with Embodiment 1 and Embodiment 2.

(Embodiment 4)

Figure 14:
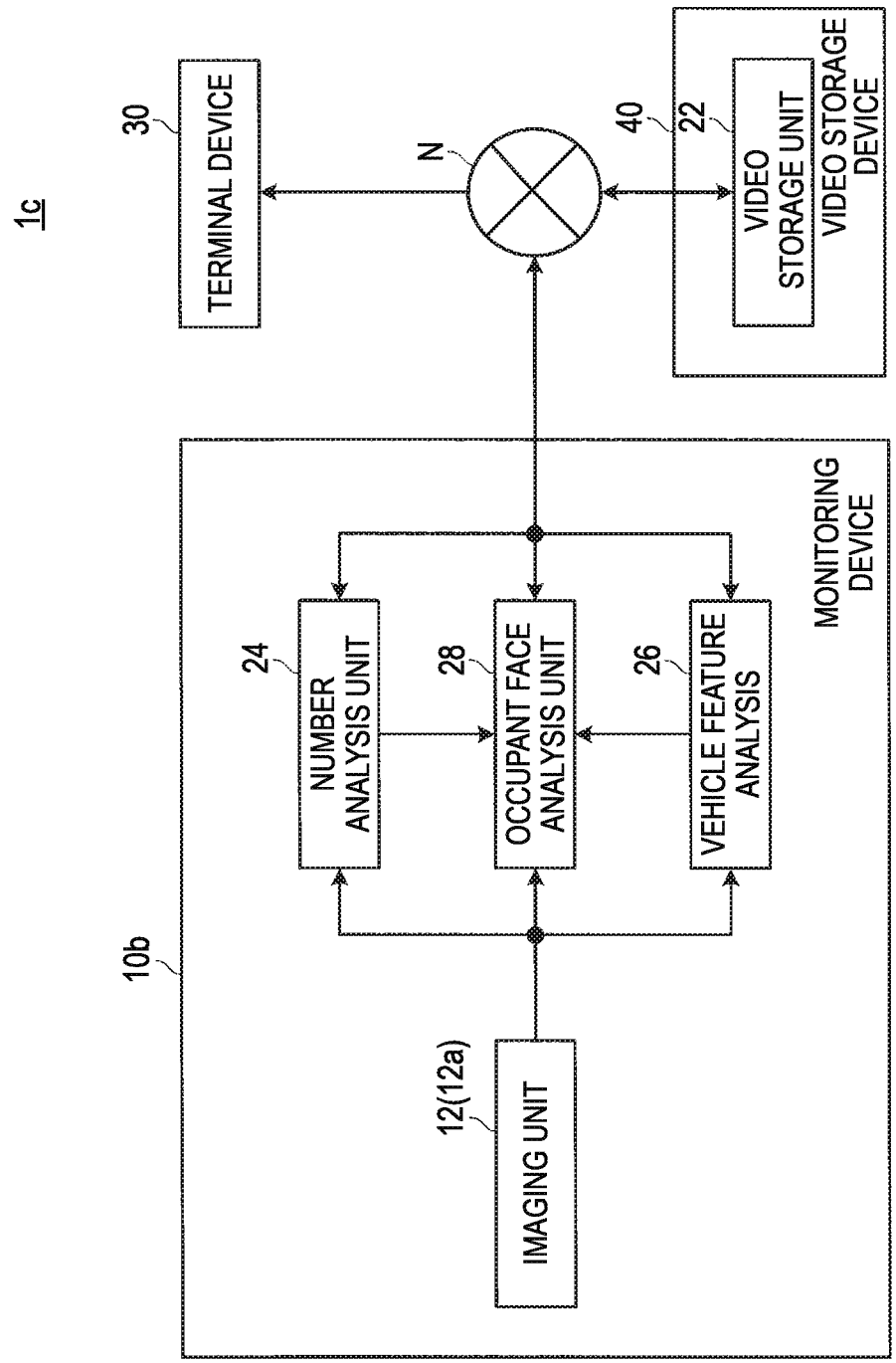
FIG. 14 is a diagram showing an example of a configuration of a monitoring system according to Embodiment 4.

FIG. 14 is a diagram showing an example of a configuration of a monitoring system 1c according to Embodiment 4.

The monitoring system 1c includes a monitoring device (imaging device and identification device) 10b, the terminal device 30, and the video storage device 40. The monitoring system 1c is different from the monitoring system 1 in that the monitoring system 1c includes the monitoring device 10b, and the video storage device 40. Description of common points of the monitoring system 1 and the monitoring system 1c will be omitted.

The monitoring device 10b images a region to be monitored and generates vehicle video data and occupant face video data. Next, the monitoring device 10b determines whether the occupant face video data is a face image analysis target based on the vehicle video data. Next, the monitoring device 10b analyzes the occupant face video data determined to be the face image analysis target, and identifies the occupant appearing in the video. Next, the monitoring device 10b notifies the terminal device 30 of the identification result.

The monitoring device 10b includes the imaging unit 12 (or imaging unit 12a), the number analysis unit 24, the vehicle feature analysis unit 26, and the occupant face analysis unit 28. The imaging unit 12 (or the imaging unit 12a), the number analysis unit 24, the vehicle feature analysis unit 26 and the occupant face analysis unit 28 of the monitoring device 10b have the same configurations as the imaging unit 12 (or the imaging unit 12a), the number analysis unit 24, the vehicle feature analysis unit 26, and the occupant face analysis unit 28 of the monitoring system 1 according to Embodiment 1, respectively. The monitoring device 10b is, for example, a server computer such as a Personal Computer (PC) or a workstation including a CPU and a memory, and realizes functions of each component by the CPU executing programs stored in the memory.

The video storage device 40 temporarily stores the video data received from the monitoring device 10. The video storage device 40 includes the video storage unit 22. The video storage unit 22 has the same configuration as the video storage unit 22 of the monitoring system 1 according to Embodiment 1.

Figure 15:
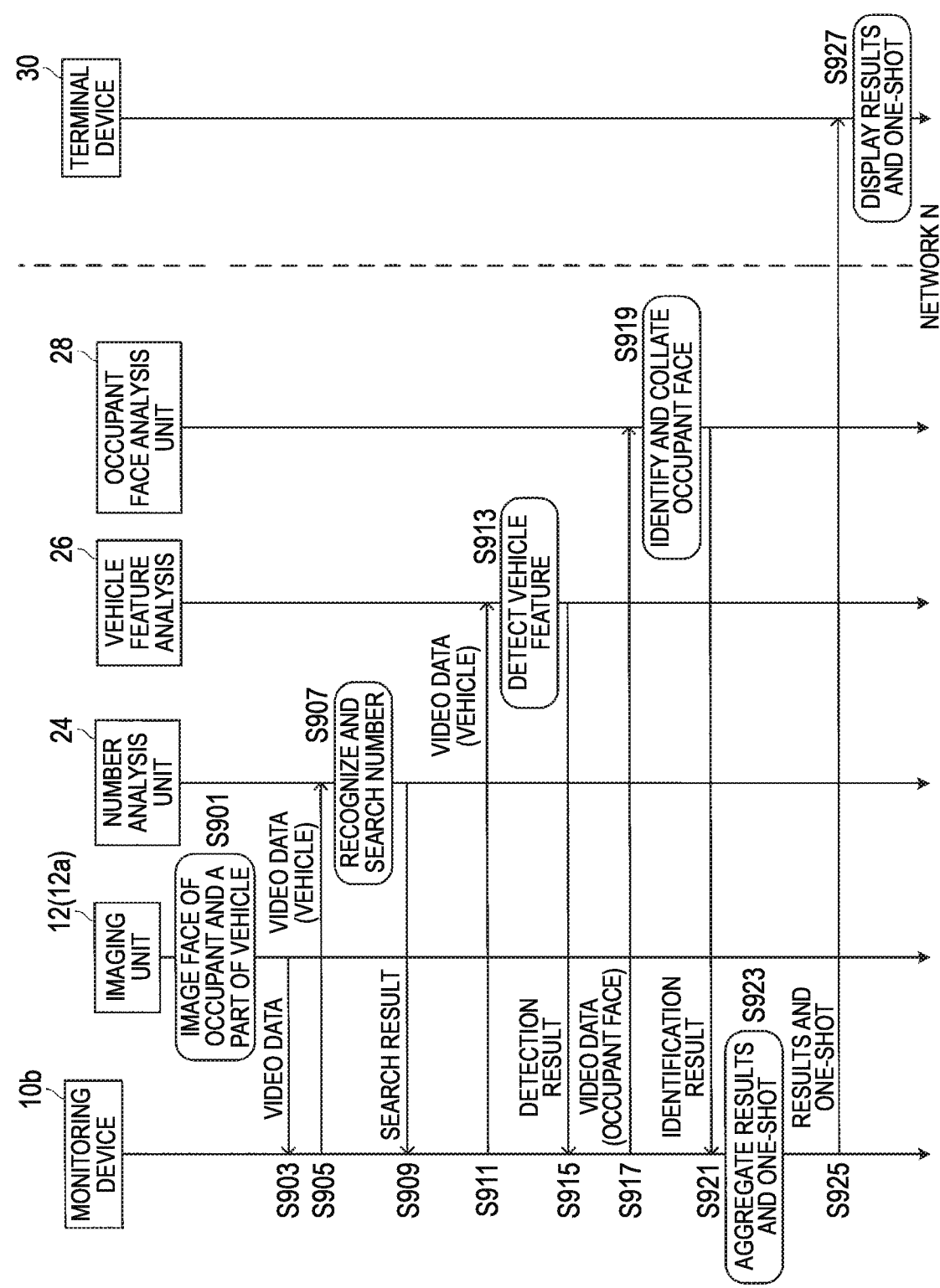
FIG. 15 is a sequence diagram showing an example of operation of the monitoring system according to Embodiment 4.

FIG. 15 is a sequence diagram showing an example of operation of the monitoring system 1c according to Embodiment 4.

In step S901, the imaging unit 12 or the imaging unit 12a images a face of an occupant on a vehicle and a part of the vehicle included the region to be monitored.

In step S903, the imaging unit 12 or the imaging unit 12a transmits the video data to the monitoring device 10b.

In step S905, the monitoring device 10b transmits vehicle video data to the number analysis unit 24.

In step S907, the number analysis unit 24 recognizes the number and searches for the recognized number from a registered number list.

In step S909, the number analysis unit 24 notifies the monitoring device 10b of the search result indicating whether the numbers match.

In step S911, the monitoring device 10b transmits vehicle video data to the vehicle feature analysis unit 26. In an example, the monitoring device 10b transmits the vehicle video data to the vehicle feature analysis unit 26 if the numbers match. In another example, the monitoring device 10b transmits the vehicle video data to the vehicle feature analysis unit 26 even if the numbers do not match.

In step S913, the vehicle feature analysis unit 26 detects a vehicle feature based on the vehicle video data.

In step S915, the vehicle feature analysis unit 26 notifies the monitoring device 10b of the detection result indicating whether the vehicle features match.

In step S917, the monitoring device 10b transmits occupant face video data to the occupant face analysis unit 28. In an example, the monitoring device 10b transmits the occupant face video data to the occupant face analysis unit 28 if the numbers match. In another example, the monitoring device 10b transmits the occupant face video data to the occupant face analysis unit 28 if the vehicle features match. In still another example, the monitoring device 10b transmits the occupant face video data to the occupant face analysis unit 28 if the numbers and the vehicle features match respectively.

In step S919, the occupant face analysis unit 28 identifies the occupant shown in the video based on the occupant face video data.

In step S921, the occupant face analysis unit 28 transmits the identification result indicating whether the occupant is identified to the monitoring device 10b.

In step S923, the monitoring device 10b aggregates the search result, the detection result, the identification result, and a one-shot.

In step S925, the monitoring device 10b notifies the terminal device 30 of the aggregated search result, detection result, identification result, and one-shot via the network N.

In step S927, the terminal device 30 displays the aggregated search result, detection result, identification result, and one-shot.

The order in which steps S905 to S909 are executed and the order in which steps S911 to S915 are executed may be reversed, or may be simultaneous (parallel execution). In this case, in an example, the monitoring device 10b transmits the vehicle video data to the number analysis unit 24 if the vehicle features match, in step S905. In another example, the monitoring device 10b transmits the vehicle video data to the number analysis unit 24 even if the vehicle features do not match.

According to Embodiment 4, the occupant face analysis unit 28 of the monitoring device 10b executes the occupant identification. Therefore, the occupant identification can be more easily distributed as compared with Embodiment 1 to Embodiment 3.

In the above embodiments, an expression "... unit" used for each component may be substituted by other expressions such as a "... circuit (circuitry)", a "... device", a "... part", a "... portion", or a "... module".

Although the embodiment is described above with reference to the drawings, it is needless to say that the present disclosure is not limited to such examples. It will be apparent to those skilled in the art that various changes and modifications can be conceived within the scope of the claims, and it should be understood that such changes and modifications belong to the technical scope of the disclosure. Each component in the above-mentioned embodiments may be combined freely in the range without deviating from the spirit of the disclosure.

The present disclosure can be implemented by software, hardware, or software in operation with hardware. Each functional block used in the description of the above embodiments is partially or entirely realized as an LSI which is an integrated circuit, and each processing described in the above embodiments may be controlled partially or entirely by one LSI or a combination of LSIs. The LSI may be provided with individual chips, or may be provided with one chip so as to include a part or all of the functional blocks. The LSI may include data input and output. The LSI may be referred to as an IC, a system LSI, a super LSI, or an ultra LSI depending on the degree of integration. The method of circuit integration is not limited to the LSI, and may be realized by a dedicated circuit, a general-purpose processor, or a dedicated processor. A Field Programmable Gate Array (FPGA) which can be programmed after manufacturing of the LSI or a reconfigurable processor which can reconfigure the connection and settings of circuit cells inside the LSI may be used. The present disclosure may be implemented as digital processing or analog processing. Further, if an integrated circuit technology that replaces the LSI emerges as a result of advancing in semiconductor technology or other derived technologies, it is naturally possible to integrate the functional blocks using this technology. The biotechnology can be applied.

The present disclosure can be implemented in all kinds of apparatuses, devices, and systems (collectively referred to as communication apparatuses) having a communication function. Non-limiting examples of the communication apparatuses include telephones (mobile phones, smart phones, etc.), tablets, personal computers (PCs) (laptops, desktops, notebooks, etc.), cameras (digital still/video cameras, etc.), digital players (digital audio/video players, etc.), wearable devices (wearable cameras, smart watches, tracking devices, etc.), game consoles, digital book readers, telehealth and telemedicine (remote healthcare/medicine prescription) devices, vehicles with communication functions or mobile transportation (automobiles, airplanes, ships, etc.) with a combination function, and combinations of the various apparatuses described above.

The communication apparatuses are not limited to portable or movable apparatuses, but can be any type of apparatuses, devices, or systems that is not portable or is fixed, such as smart home apparatuses (home appliances, lighting apparatuses, smart meters, or measuring apparatuses, control panels, etc.), vending machines, and any other "things" that may exist on an Internet of Things (IoT) network.

The communication includes data communication by a cellular system, a wireless LAN system, a communication satellite system, or the like and data communication by a combination of the above communication systems. Communication apparatuses also include apparatuses such as controllers or sensors that are connected or coupled to the communication apparatuses that execute the communication functions described in the present disclosure. For example, a controller or a sensor that generates a control signal or a data signal used by a communication apparatus that executes a communication function of the communication apparatus is included.

The communication devices include infrastructure equipment such as base stations, access points, and any other apparatuses, devices, and systems that communicate with or control the various non-limiting apparatuses described above.

The imaging device according to the present disclosure includes an imaging element and a processor that allocates an image frame, that is obtained from output of the imaging element, to different video streams according to an exposure time of the imaging element in the image frame.

In the imaging device according to the present disclosure, the processor sets exposure times of the imaging element in a plurality of the successive image frames into a first exposure time and a second exposure time shorter than the first exposure time alternately.

In the imaging device according to the present disclosure, the plurality of video streams are a first video stream and a second video stream, and the processor allocates, to the first video stream, an image frame in which a part of an occupant on a moving object including a face of the occupant is imaged by the imaging element at the first exposure time, and allocates, to the second video stream, an image frame in which a part of the moving object is imaged by the imaging element at the second exposure time.

The imaging method according to the present disclosure includes acquiring an image frame from output of an imaging element, and allocating the image frame to different video streams according to an exposure time of the imaging element in the image frame.

The identification device according to the present disclosure includes a processor that acquires a result of determining, based on a part of images with an moving object imaged which does not include a face of an occupant on the moving object, whether the occupant is an identification target, and identifies the occupant face based on an image including the occupant face if the result indicates that the occupant is the identification target.

In the identification device according to the present disclosure, the part of images which does not include the face of the occupant on the moving object includes an image of a license plate, and the determination as to whether the occupant is the identification target is based on a number shown by the license plate.

In the identification device according to the present disclosure, the moving object is a vehicle, the part of images which does not include the face of the occupant on the moving object includes at least one image of an emblem of a vehicle, a headlight of the vehicle, a front mask of the vehicle, a tire of the vehicle, a wheel of the vehicle, and a painted portion of the vehicle, and the determination as to whether the occupant is the identification target is based on at least one of the emblem, the headlight, the front mask, the tire of the vehicle, the wheel of the vehicle, and a color of the painted portion.

In the identification device according to the present disclosure, the part of images which does not include the face of the occupant on the moving object includes an image of at least a part of clothes worn by the occupant, and the determination as to whether the occupant is the identification target is based on a color of the clothes.

The identification method according to the present disclosure includes acquiring a result of determining, based on a part of images with an moving object imaged which does not include a face of an occupant on the moving object, whether the occupant is an identification target, and identifying the occupant face based on an image including the occupant face if the result indicates that the occupant is the identification target.

When being executed, the identification program according to the present disclosure causes a processor to acquire a result of determining, based on a part of images with an moving object imaged which does not include a face of an occupant on the moving object, whether the occupant is an identification target, and to identify the occupant face based on an image including the occupant face if the result indicates that the occupant is the identification target.

Industrial Applicability

The present disclosure is useful for a monitoring system that monitors an occupant of a traveling vehicle.

This application is based on Japanese Patent Application (No. 2019-005080) filed on Jan. 16, 2019, the contents of which are incorporated herein by reference.

What is claimed is:

1. A vehicle monitoring system comprising:
a monitoring device, a video storage and analysis device, and a terminal device, wherein:
  the monitoring device is configured to image an occupant of a vehicle and image at least a part of the vehicle and to transmit vehicle video data relating to the image of the at least the part of the vehicle to the video storage and analysis device;
  the video storage and analysis device is configured to detect whether the vehicle included in the vehicle video data transmitted from the monitoring device matches a vehicle registered in advance;
  the monitoring device is configured to transmit occupant video data relating to the image of the occupant to the video storage and analysis device in response to a detection result of the video storage and analysis device detecting that the vehicle included in the vehicle video data matches the vehicle registered in advance;
  the video storage and analysis device is configured to identify the occupant included in the occupant video data in response to the detection result detecting that the vehicle included in the vehicle video data matches the vehicle registered in advance and the occupant video data being transmitted by the monitoring device;
  the video storage and analysis device is configured to transmit the vehicle included in the matched vehicle video data and the identified occupant to the terminal device in response to the detection result detecting that the vehicle included in the vehicle video data matches the vehicle registered in advance and an identification result of the video storage and analysis device identifying the occupant; and
  the terminal device is configured to display the vehicle and the occupant,
wherein, in response to the detection result detecting that the vehicle included in the vehicle video data does not match the vehicle registered in advance, the occupant video data relating to the image of the occupant is discarded.

2. The vehicle monitoring system according to claim 1, wherein:
  the video storage and analysis device is configured to detect whether the vehicle included in the vehicle video data matches the vehicle registered in advance, based on a vehicle number included in the vehicle video data.

3. The vehicle monitoring system according to claim 1, wherein:
  the video storage and analysis device is configured to detect whether the vehicle included in the vehicle video data matches the vehicle registered in advance, based on a vehicle feature included in the vehicle video data.

4. The vehicle monitoring system according to claim 1, wherein:
  the occupant video data includes a face of the occupant; and
  the video storage and analysis device is configured to transmit an image relating to the face of the occupant, which is successfully identified among images included in the occupant video data.

5. The vehicle monitoring system according to claim 4, wherein:

the image relating to the face of the occupant, which is successfully identified among images included in the occupant video data, is a one-shot image.

6. The vehicle monitoring system according to claim 5, wherein:
the video storage and analysis device is configured to aggregate the detection result of the vehicle, the identification result of the occupant, and the one-shot image, and to transmit the detection result of the vehicle, the identification result of the occupant, and the one-shot image to the terminal device.

7. The vehicle monitoring system according to claim 1, wherein:
a process, by which the video storage and analysis device is configured to identify the occupant included in the occupant video data in response to the detection result detecting that the vehicle included in the vehicle video data matches the vehicle registered in advance, includes collating an occupant face in the occupant video data.

8. A vehicle monitoring method implemented by a vehicle monitoring system including a monitoring device, a video storage and analysis device, and a terminal device, the vehicle monitoring method comprising:
imaging an occupant of a vehicle and imaging at least a part of the vehicle;
transmitting vehicle video data relating to an image of the at least the part of the vehicle to the video storage and analysis device;
detecting whether the vehicle included in the vehicle video data matches a vehicle registered in advance;
transmitting occupant video data relating to the image of the occupant to the video storage and analysis device in response to a detection result detecting that the vehicle included in the vehicle video data matches the vehicle registered in advance;
identifying the occupant included in the occupant video data in response to the detection result detecting that the vehicle included in the vehicle video data matches the vehicle registered in advance and the occupant video data being transmitted to the video storage and analysis device;
transmitting the vehicle included in the matched vehicle video data and the identified occupant to the terminal device in response to the detection result detecting that the vehicle included in the vehicle video data matches the vehicle registered in advance and an identification result identifying the occupant;
displaying the vehicle and the occupant on the terminal device in response to the vehicle and the identified occupant being transmit; and
in response to the detection result detecting that the vehicle included in the vehicle video data does not match the vehicle registered in advance, discarding the occupant video data relating to the image of the occupant.

9. The vehicle monitoring method according to claim 8, wherein:
a process by which the occupant included in the occupant video data is identified in response to the detection result detecting that the vehicle included in the vehicle video data matches the vehicle registered in advance, includes collating an occupant face in the occupant video data.

* * * * *